(12) United States Patent
Ly et al.

(10) Patent No.: US 8,938,553 B2
(45) Date of Patent: Jan. 20, 2015

(54) COOPERATIVE PROXY AUTO-DISCOVERY AND CONNECTION INTERCEPTION THROUGH NETWORK ADDRESS TRANSLATION

(75) Inventors: Kand Ly, Richmond, CA (US); Michael J. Demmer, San Francisco, CA (US); Steven McCanne, Berkeley, CA (US); Alfred Landrum, San Francisco, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 290 days.

(21) Appl. No.: 13/436,873

(22) Filed: Mar. 31, 2012

(65) Prior Publication Data

US 2013/0091273 A1    Apr. 11, 2013

Related U.S. Application Data

(63) Continuation-in-part of application No. 12/135,114, filed on Jun. 6, 2008, now abandoned, which is a continuation of application No. 10/640,459, filed on Aug. 12, 2003, now Pat. No. 7,650,416.

(51) Int. Cl.
*G06F 15/16* (2006.01)
*H04L 12/24* (2006.01)
*H04L 29/12* (2006.01)
(Continued)

(52) U.S. Cl.
CPC ............... *H04L 41/00* (2013.01); *H04L 67/16* (2013.01); *H04L 67/28* (2013.01); *H04L 61/2589* (2013.01); *H04L 61/2567* (2013.01); *H04L 61/2514* (2013.01); *H04L 67/2804* (2013.01); *H04L 67/2819* (2013.01); *H04L 67/2842* (2013.01); *H04L 67/146* (2013.01); *H04L 67/147* (2013.01); *H04L 43/10* (2013.01); *H04L 41/0663* (2013.01)
USPC ........... 709/236; 709/233; 709/234; 709/235; 709/237

(58) Field of Classification Search
CPC ................................ H04L 67/16; H04L 67/28
USPC .................................................. 709/233–239
See application file for complete search history.

(56) References Cited

U.S. PATENT DOCUMENTS

| 6,195,366 B1 * | 2/2001 | Kayashima et al. .......... 370/475 |
| 6,415,329 B1 * | 7/2002 | Gelman et al. ................ 709/245 |
| 6,473,406 B1 * | 10/2002 | Coile et al. .................... 370/248 |

(Continued)

*Primary Examiner* — Hieu Hoang
(74) *Attorney, Agent, or Firm* — Park, Vaughan, Fleming & Dowler LLP

(57) ABSTRACT

Proxy devices associate their direct connection with a client/server connection passing through one or more NAT devices. First proxy device receives a network connection request from a client. First proxy device stores connection information in association with a connection identifier. Connection information may reflect the usage of NAT devices between the two proxy devices. First proxy device sends a connection response including the connection identifier to the client. Second proxy device sends a direct connection request to first proxy device to establish a direct connection. Direct connection request includes the connection identifier, which is used by first proxy device to associate the direct connection with stored connection information. First proxy device may use the connection information to direct network traffic received via this direct connection to the correct destination and to divert network traffic from the server to the client through the direct connection and first and second proxy devices.

18 Claims, 14 Drawing Sheets

(51) Int. Cl.
*H04L 29/08* (2006.01)
*H04L 12/26* (2006.01)

(56) References Cited

U.S. PATENT DOCUMENTS

| | | | |
|---|---|---|---|
| 6,487,538 B1 * | 11/2002 | Gupta et al. | 705/14.66 |
| 6,513,061 B1 * | 1/2003 | Ebata et al. | 709/203 |
| 6,598,081 B1 * | 7/2003 | Coile et al. | 709/227 |
| 6,721,780 B1 * | 4/2004 | Kasriel et al. | 709/203 |
| 6,772,193 B1 * | 8/2004 | Igawa et al. | 709/203 |
| 6,874,017 B1 * | 3/2005 | Inoue et al. | 709/217 |
| 6,894,981 B1 * | 5/2005 | Coile et al. | 370/248 |
| 6,940,835 B2 * | 9/2005 | Reza et al. | 370/331 |
| 6,973,485 B2 * | 12/2005 | Ebata et al. | 709/219 |
| 6,981,029 B1 * | 12/2005 | Menditto et al. | 709/217 |
| 7,010,762 B2 * | 3/2006 | O'Neil | 715/853 |
| 7,047,485 B1 * | 5/2006 | Klein et al. | 715/205 |
| 7,123,613 B1 * | 10/2006 | Chawla et al. | 370/389 |
| 7,161,947 B1 * | 1/2007 | Desai | 370/401 |
| 7,316,028 B2 * | 1/2008 | Donatelli et al. | 726/11 |
| 7,328,260 B1 * | 2/2008 | Muthiyan et al. | 709/224 |
| 7,577,729 B1 * | 8/2009 | Umbehocker et al. | 709/223 |
| 7,769,834 B2 * | 8/2010 | Ly et al. | 709/220 |
| 7,953,869 B2 * | 5/2011 | Demmer et al. | 709/228 |
| 2001/0027492 A1 * | 10/2001 | Gupta | 709/245 |
| 2001/0051927 A1 * | 12/2001 | London et al. | 705/51 |
| 2002/0062384 A1 * | 5/2002 | Tso | 709/229 |
| 2002/0069282 A1 * | 6/2002 | Reisman | 709/227 |
| 2002/0085549 A1 * | 7/2002 | Reza et al. | 370/389 |
| 2002/0156911 A1 * | 10/2002 | Croman et al. | 709/235 |
| 2002/0157019 A1 * | 10/2002 | Kadyk et al. | 713/201 |
| 2003/0043844 A1 * | 3/2003 | Heller | 370/466 |
| 2003/0055826 A1 * | 3/2003 | Graham | 707/10 |
| 2003/0115488 A1 * | 6/2003 | Kunito et al. | 713/201 |
| 2003/0163646 A1 * | 8/2003 | O'Neil | 711/137 |
| 2003/0182437 A1 * | 9/2003 | Kobayashi et al. | 709/232 |

\* cited by examiner

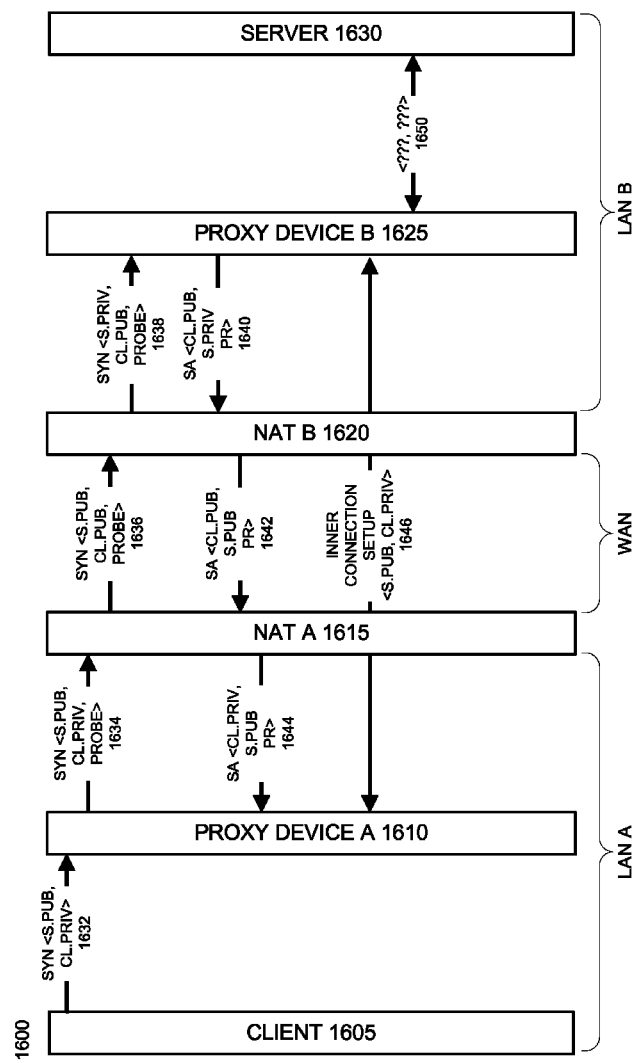

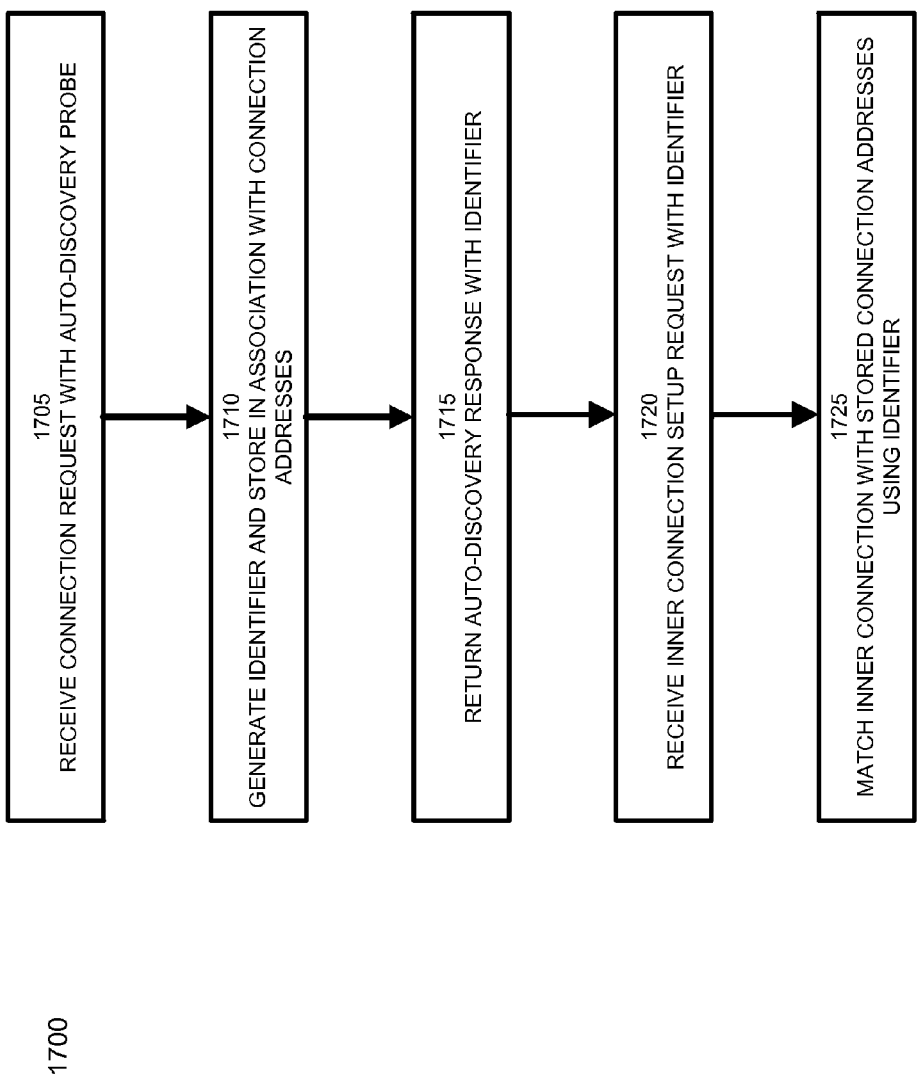

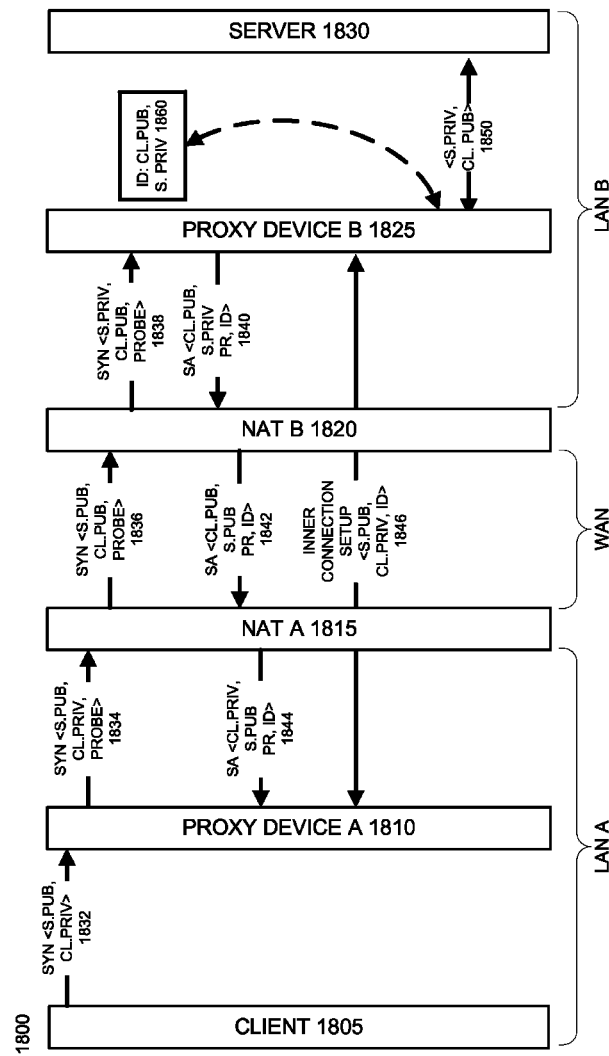

COOPERATIVE PROXY AUTO-DISCOVERY AND CONNECTION INTERCEPTION THROUGH NETWORK ADDRESS TRANSLATION

CROSS-REFERENCES TO RELATED APPLICATIONS

This application is a continuation-in-part of U.S. patent Ser. No. 12/135,114, filed Jun. 6, 2008, now abandoned and entitled "Cooperative Proxy Auto-Discovery and Connection Interception," which is a continuation of U.S. patent application Ser. No. 10/640,459 filed Aug. 12, 2003, now U.S. Pat. No. 7,650,416, entitled "Content Delivery for Client-Server Protocols With User Affinities Using Connection End-Point Proxies," incorporating by reference U.S. patent application Ser. No. 10/640,562, also filed Aug. 12, 2003, now U.S. Pat. No. 7,318,100, entitled Cooperative Proxy Auto-Discovery and Connection Interception, all of which are incorporated by reference herein for all purposes.

The present disclosure is related to the following commonly assigned U.S. Patent Applications:

U.S. patent application Ser. No. 10/285,315 entitled "Transaction Accelerator for Client-Server Communication Systems" (hereinafter "McCanne I") filed on Oct. 30, 2002, now U.S. Pat. No. 7,120,666 B2 issued Oct. 10, 2006, is incorporated by reference herein for all purposes.

U.S. patent application Ser. No. 10/285,330 entitled "Content-Based Segmentation Scheme for Data Compression in Storage and Transmission Including Hierarchical Segment Representation" (hereinafter "McCanne II") filed on Oct. 30, 2002, now U.S. Pat. No. 6,667,700 issued Dec. 23, 2003, is incorporated by reference herein for all purposes.

U.S. patent application Ser. No. 10/640,405 entitled "Transparent Client-Server Transaction Accelerator" (hereinafter "McCanne III") filed on Aug. 12, 2003 now U.S. Publication No. 2004/0215746 published Oct. 28, 2004, is incorporated by reference herein for all purposes.

FIELD OF THE INVENTION

The present invention relates generally to networking and proxies, and more specifically to establishing communication between and through proxy agents in a data network.

BACKGROUND OF THE INVENTION

A network is typically used for data transport among devices at network nodes distributed over the network. Some networks are considered "local area networks" (LANs), others are considered "wide area networks" (WANs), although not all networks are so categorized and others might have both LAN and WAN characteristics. Often, a LAN comprises nodes that are all controlled by a single organization and connected over dedicated, relatively reliable and physically short connections. An example might be a network in an office building for one company or division. By contrast, often a WAN comprises nodes that might include nodes over which many different organization's data flow, and might involve physically long connections. In one example, a LAN might be coupled to a global internetwork of networks referred to as the "Internet" such that traffic from one node on the LAN passes through the Internet to a remote LAN and then to a node on that remote LAN.

Data transport is often organized into "transactions", wherein a device at one network node initiates a request for data from another device at another network node and the first device receives the data in a response from the other device. By convention, the initiator of a transaction is referred to herein as the "client" and the responder to the request from the client is referred to herein as the "server".

Notably, in some instances, what is normally thought of as the client is in fact the server, as with the example of a window system referred to as "X". In some instances, a device, program, or other computing entity can be a client for some transactions and a server for others. For example, suppose device A and device B are coupled by a network and device A makes a request for data of device B. For that transaction, device A is the client and device B is the server. Now, if device B only responds to authorized requests, device B might make a request of device A for authentication data. Thus, for the authentication transaction, device B would be the client and device A would be the server, the reverse of the roles for the data request transaction.

As explained above, a transaction over a network involves bidirectional communication between two computing entities, where one entity is the client and initiates a transaction by opening a network channel to another entity (the server). Typically, the client sends a request or set of requests via a set of networking protocols over that network channel, and the request or requests are processed by the server, returning responses. Many protocols are connection-based, whereby the two cooperating entities (sometimes known as "hosts") negotiate a communication session to begin the information exchange. In setting up a communication session, the client and the server might each maintain state information for the session, which may include information about the capabilities of each other. At some level, the session forms what is logically (or physically, in some cases) considered a "connection" between the client and server. Once the connection is established, communication between the client and server can proceed using state from the session establishment and other information and send messages between the client and the server, wherein a message is a data set comprising a plurality of bits in a sequence, possibly packaged as one or more packets according to an underlying network protocol. Typically, once the client and the server agree that the session is over, each side disposes of the state information for that transaction, other than possibly saving log information.

To realize a networking transaction, computing hosts make use of a set of networking protocols for exchanging information between the two computing hosts. Many networking protocols have been designed and deployed, with varying characteristics and capabilities. The Internet Protocol (IP), Transmission Control Protocol (TCP), and User Datagram Protocol (UDP) are three examples of protocols that are in common use today. Various other networking protocols might also be used.

Since protocols evolve over time, a common design goal is to allow for future modifications and enhancements of the protocol to be deployed in some entities, while still allowing those entities to interoperate with hosts that are not enabled to handle the new modifications. One simple approach to accomplishing interoperability is a protocol version negotiation. In an example of a protocol version negotiation, one entity informs the other entity of the capabilities that the first entity embodies. The other entity can respond with the capabilities that the other entity embodies. Through this negotiation, each side can be made aware of the capabilities of the other, and the channel communication can proceed with this shared knowledge. To be effective, this method must ensure that if one entity advertises a capability that the other entity does not understand, the second entity should still be able to handle the connection. This method is used in both the IP and TCP protocols—each provides a mechanism by which a variable length set of options can be conveyed in a message. The specification for each protocol dictates that if one entity does not have support for a given option, it should ignore that option when processing the message. Other protocols may have a similar features that allow for messages to contain data that is understood by some receivers of the data but possibly not understood by other receivers of the data, wherein a receiver that does not understand the data will not fail in its task and will typically forward on the not understood data such that another entity in the path will receive that data.

A message from a client to a server or vice-versa traverses one or more network "paths" connecting the client and server. A basic path would be a physical cable connecting the two hosts. More typically, a path involves a number of physical communication links and a number of intermediate devices (e.g., routers) that are able to transmit a packet along a correct path to the server, and transmit the response packets from the server back to the client. These intermediate devices typically do not modify the contents of a data packet; they simply pass the packet on in a correct direction. However, it is possible that a device that is in the network path between a client and a server could modify a data packet along the way. To avoid violating the semantics of the networking protocols, any such modifications should not alter how the packet is eventually processed by the destination host.

While routing protocols generally control how packets are forwarded through a network, sometimes it is desirable to control the forwarding of an individual packet according to rules that override the normal packet routing logic. A common mechanism for accomplishing this is via a set of packet filtering rules. These rules specify characteristics of individual packets and a desired action or actions to take on each individual packet that meets the characteristics. For example, a firewall employs certain packet filters to dictate that some packets should be forwarded, while other packets should be rejected.

Another mechanism that affects the forwarding of an individual packet and overrides the normal packet routing logic is network address translation (NAT). Using NAT, an entity that receives packets modifies the packet's destination and/or source address before passing on the packet. NAT is commonly used at the border between one network of hosts and another network of hosts (or the Internet as a whole). A router or other such device deployed at the border is configured with a set of rules indicating which packets should have the NAT operation applied, though this may in practice end up being all packets that traverse the device. In this scenario, a set of hosts can be configured with a private range of IP addresses that is not exposed to other hosts in the network—rather the border router rewrites the source address of outgoing packets from the original host's private address to one of a given set of public addresses. This way, the destination server does not need to have routing information to reach the private address, since it perceives all connections as coming from the public address. The router maintains state such that for response packets coming back from the server (addressed to the public destination address), it rewrites the destination and forwards the packet to the original private address, thus routing the packet back to the original client host.

NAT is also used by Layer 4 switch devices ("L4 switches"). An L4 switch is a device that is deployed in the network path that can route all the packets for a particular connection to a destination that differs from the original destination field of each packet in the connection. A common deployment of L4 switches is for use in load balancing. In this type of deployment, a set of servers (each having distinct addresses) is deployed to share the load from client requests such that a connection from a client to a particular server (often called a virtual server) can be routed to and terminated by any server in the set. Rather than rely on the client to choose one of the given servers, an L4 switch is deployed in the network path between the clients and this set of servers. The switch examines the packets and, based on its configuration, uses NAT to forward all packets from a particular client-server connection to a particular server in the set, and conversely, forward all packets from that particular server to the client such that, to the client, the packets appear to come from the virtual server.

Another related concept is that of a network proxy. A network proxy is a transport-level or application-level entity that functions as a performance-enhancing intermediary between the client and the server. In this case, a proxy is the terminus for the client connection and initiates another connection to the server on behalf of the client. Alternatively, the proxy connects to one or more other proxies that in turn connect to the server. Each proxy may forward, modify, or otherwise transform the transactions as they flow from the client to the server and vice versa. Examples of proxies include (1) Web proxies that enhance performance through caching or enhance security by controlling access to servers, (2) mail relays that forward mail from a client to another mail server, (3) DNS relays that cache DNS name resolutions, and so forth.

One problem that must be overcome when deploying proxies is that of directing client requests to the proxy instead of to the destination server. One mechanism for accomplishing this is to configure each client host or process with the network address information of the proxy. This requires that the client application have an explicit proxy capability, whereby the client can be configured to direct requests to the proxy instead of to the server. In addition, this type of deployment requires that all clients must be explicitly configured and that can be an administrative burden on a network administrator.

One way around the problems of explicit proxy configuration is to deploy a transparent proxy. The presence of the transparent proxy is not made explicitly known to the client process, so all client requests proceed along the network path towards the server as they would have if there were no transparent proxy. This might be done by placing the transparent proxy host in the network path between the client and the server. An L4 switch is then employed so the proxy host can intercept client connections and handle the requests via the proxy. For example, the L4 switch could be configured so that all Web connections (i.e., TCP connections on port 80) are routed to a local proxy process. The local proxy process can then perform operations on behalf of the server. For example, the local proxy process could respond to the request using information from its local cache. When intercepting the connection, the L4 switch performs NAT so the connection appears to the client as having been terminated at the origin server, even though the client communicates directly with the proxy. In this manner, the benefits of a proxy can be realized without the need for explicit client configuration.

Some benefits of a transparent proxy require that a proxy pair exist in the network path. For example, if a proxy is used to transform data in some way, a second proxy preferably untransforms the data. For example, where traffic between a client and a server is to be compressed or encrypted for transport over a portion of the network path between the client and the server, a proxy on one side of that portion would compress or encrypt data before it flows over that portion and a proxy on the other side of that portion would uncompress or decrypt the data and send it along the network path, thereby providing for transparent transformation of data flowing between the client and the server.

For actions that require a proxy pair, preferably both proxies in the proxy pair do not perform a transformation unless they can be assured of the existence and operation of the other proxy in the proxy pair. Where each proxy must be explicitly configured with indications of the pairs to which it belongs and to the identity of the other members of those pairs, the administrative burden on a network administrator might well make some operations infeasible if they require proxy pairs. Even where a proxy is interposed in a network and gets all of the traffic from a client or server, it still must discover the other member for each proxy pair the proxy needs, if the proxy is to perform actions that require proxy pairs.

BRIEF SUMMARY OF THE INVENTION

Embodiments of the invention enable proxy devices to associate a direct connection with each other with a client/server connection passing through one or more network address translation (NAT) devices. In an embodiment, a first proxy device receives or intercepts a network connection request from a client device including an auto-discovery indicator. The auto-discovery indicator signals to the proxy device that a second proxy device has previously intercepted this connection request. In response to this network connection request, the first proxy device stores connection information, such as the client and server device network addresses and network ports, in association with a connection identifier. The connection information includes network addresses or other information as they are received by the first proxy device and may reflect the usage of one or more NAT devices between the two proxy devices.

The first proxy device sends a connection response back to the client device including an auto-discovery response indicator and a copy of the connection identifier. The auto-discovery response indicator signals to the second proxy device that the first proxy device has also intercepted this connection request. The second proxy device sends one or more inner connection setup messages to the first proxy device to establish a direct connection between these two proxy devices, referred to as an inner connection. The inner connection setup messages include a copy of the connection identifier. The first proxy device uses the connection identifier to associate this inner connection between the proxy devices with the previously stored connection information for the network connection between the client and the server. This connection information may be used by the first proxy device to direct network traffic, including optimized network traffic, received via this inner connection to the correct destination. This connection information may also be used by the first proxy device to divert network traffic from the server to the client through the inner connection and the first and second proxy devices.

BRIEF DESCRIPTION OF THE DRAWINGS

FIG. 16 illustrates an example problem encountered during auto-discovery and connection establishment between two proxy devices separated by one or more NAT devices.

FIG. 17 illustrates a method of automatically discovering and establishing connections between proxy devices separated by one or more NAT devices according to an embodiment of the invention.

FIG. 18 illustrates an example implementation of auto-discovery and connection establishment between two proxy devices separated by one or more NAT devices according to an embodiment of the invention.

DETAILED DESCRIPTION OF THE INVENTION

Figure 1:
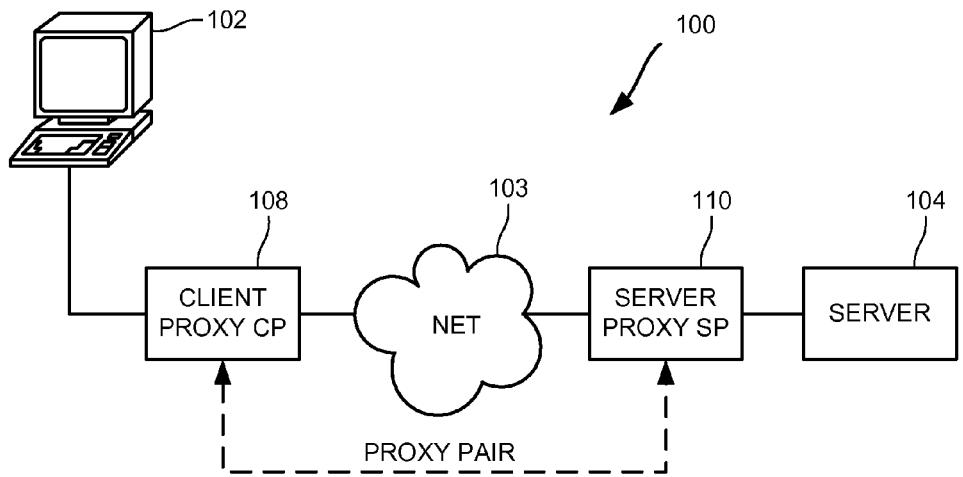
FIG. 1 is a block diagram of a networked system where a client-side proxy and a server-side proxy are interposed in a network path between a client and a server.

The present invention has many applications, as will be apparent after reading this disclosure. In describing an embodiment of proxy discovery or network transaction interception according to the present invention, only a few of the possible variations are described. Other applications and variations will be apparent to one of ordinary skill in the art, so the invention should not be construed as narrowly as the examples, but rather in accordance with the appended claims.

A general problem when deploying multiple network entities in a cooperative scenario, in which the devices must coordinate and interact with one another, is that of configuration. This problem is especially acute when trying to deploy cooperative transparent proxy functionality that depends on several cooperating network entities, such as where network traffic between a client and a server is to be intercepted by one proxy that in turn communicates with one or more other proxies to process the network traffic. In general, the proxies may modify or otherwise process the client-server traffic using techniques that are incompatible with the original client-server protocol and thus require a proxy at some point to process the data back to a form that is compatible with the original client-server protocol. The conversion of the data back into the compatible form could be a conversion packet to data identical to what was converted, but need not be identical so long as protocol requirements are met.

Devices such as L4 switches can intercept network traffic without explicit client and/or server configuration, but that approach cannot accommodate proxy pairs, where an intercepting device pairs with another intercepting device such that the first device transforms the data and the second device untransforms the data to reconstitute exactly what the first device received or to generate data that is not exactly what the first device received but is in conformance with the protocol. For example, transformation might include the removal of extraneous data and further transformation, while the untransformation does not add back the extraneous data but does an inverse of the further transformation. In such a scenario, a given proxy must still be aware of the existence and network address information of the other cooperating proxies. For example, in a system where two proxies are performing a transport layer compression operation such as the segment cloning described in McCanne I, the two proxies that form a proxy pair need to be aware that there is a corresponding proxy also in the network path to perform the compression operation.

As used herein, "proxy pairing" is a process of associating two proxies. The two proxies are members of a proxy pair and each member of a proxy pair is aware of the other member of the proxy pair and knows its address (or other identifier). A given proxy can be a member of more than one proxy pair. Where a given proxy is a member of a plurality of proxy pairs, the other members of those proxy pairs can be distinct or can be duplicative, i.e., there might be more than one proxy pair that has the same two members. In some cases, a proxy pair might be generalized to a "proxy grouping" of more than two proxies for purposes equivalent to what a proxy pair might do.

Generally, a proxy pair exists in relation to one or more transactions. Thus, proxy A and proxy B might be paired for some transactions and not others. Often, two proxies are paired for all transactions between pairs of particular clients and particular servers. In most instances, a proxy pair comprises a client-side proxy ("CP") and a server-side proxy ("SP") and each member of the proxy pair is aware of which side (client or server) they are on.

The proxies in a proxy pair can become aware of the pair and the other member (and which side they are on) by being explicitly configured as a proxy in a proxy pair, the proxies can become aware based on information provided by a client or a server (which typically requires an appropriately configured client or server), or the proxies can automatically discover possible proxy pairs using techniques described herein. Naturally, if proxies can discover proxy pairs of which they are members without any assistance from a client, a server or a network configurator, in a way that such discovery can have been transparent to clients and servers, operation and maintenance of a proxy pairing system is greatly simplified.

Once the proxies in a proxy pair are aware of the pairing and the other member, the pair can intercept network transactions. Once intercepted, such proxies are able to implement performance-enhancing optimizations to both the transport protocol as well as the application data payloads in a transparent fashion and thus remain backward compatible with existing deployments of clients and servers. With the pairing, the optimizations need not conform to the end-to-end network protocol, as each proxy can undo nonconforming operations of the other proxy.

Connection interception can be done by a number of different devices, which might involve hardware, software, or both. Interception can be done with a computer, computing device, peripheral, electronics, or the like, and/or using an application being executed or controlled by such element. The interception mechanism can be integrated into a network device such as a router or a bridge, such that some of the traffic that flows through the device is altered by the interception mechanism. The interception mechanism may alternatively be integrated into the client and/or the server itself. Thus, when describing herein a client-side proxy and/or server-side proxy, those terms need not necessarily refer to separate physical hosts or computing entities, but may be logical entities that are part of the client, the server, and/or any other routers, devices or hosts along the network path between the client and server.

The general term "proxy device" is used to refer to a proxy that could be a client-side proxy, a server-side proxy, or both (client-side proxy for some pairs/transactions, server-side proxy for other pairs/transactions). The functionality described herein as the CP and the functionality described herein as the SP can exist in one proxy device, such that the proxy device functions as both an SP and a CP, simultaneously, for different client-server connections.

It should be understood that while clients, servers and proxy devices are shown herein in various places as stand-alone boxes, clients, servers and proxies can be implemented as discrete hardware elements, software elements running on a programmable computing element (desktop computer, handheld device, router, switch, embedded logic device, etc.), firmware, or some combination, running as distinct elements or integrated with other elements. For example, a router might include software to implement a proxy device ("PD") that might be a CP or an SP for some transactions, with that CP or SP functionality entirely implemented as part of the router.

FIG. 1 illustrates a simple example of a networking configuration wherein a proxy pair is interposed in a network path between a client and a server. As shown there, system 100 can be used for communications between a client 102 and a server 104 across a network 103. In a number of examples, network 103 is a WAN, but this description is not so limited. A proxy pair comprises a client-proxy CP 108 and a server-proxy SP 110. CP 108 is interposed between client 102 and network 103, while SP 110 is interposed between network 103 and a server 104.

For the sake of clarity and simplicity, client 102, server 104, CP 108, and SP 110 are shown as separate computing entities, but that need not be the case. Most of the description below assumes that CP 108 and the SP are "in-path" between client 102 and server 104 such that all network packets sent from client 102 to server 104 pass through CP 108, then SP 110, then reach server 104, and vice versa, but other paths are possible. There may be any number of other hosts and/or network devices (not shown), comprising a routed data network, between client 102 and CP 108 and SP 110 and server 104.

Later discussion describes elements of relevant systems with respect to the topology of FIG. 1, however other more complex topologies are possible. For example, FIG. 2 shows how multiple devices can be present in a networked environment.

Figure 2:
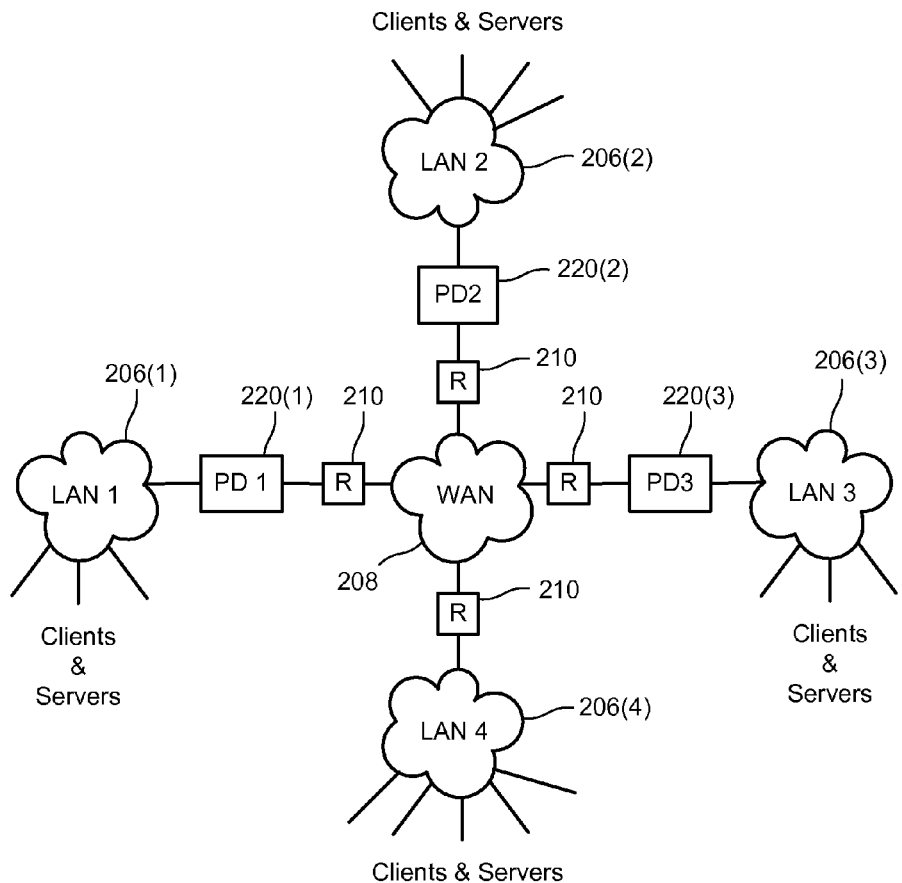
FIG. 2 is a block diagram of a networked system wherein various LANs are coupled to a WAN, some of which include proxy devices and some of which do not.

In the topology of FIG. 2, four LANs 206 are coupled in an internetwork including a WAN 208, which interfaces to each of the LANs in this example via one of a plurality of routers 210, as might be conventionally used. Some LANs 206 are coupled to their respective routers 210 directly (e.g., LAN 4), while others are coupled via a proxy device PD 220 (e.g., LAN 1, LAN 2, LAN 3). Note that each LAN 206 might support both clients and servers, each of which might use the services of their proxy device and possibly other proxy devices.

As an example of a client-server connection, a client on LAN 1 might initiate a connection to a server on LAN 2. The connection could be proxied through PD 1 and PD 2 to enhance performance. Similarly, a client communicating from LAN 3 to a server on LAN 1 might benefit if the connection were proxied by PD 3 and PD 1. However, if a client on LAN 1 were to communicate with a server on LAN 4, no such paired proxying should occur because there is no proxy device present for LAN 4. Proxies are preferably able to automatically determine where and when other pairable proxies are present on paths between a client and a server so that connections are not intercepted at either end unless a proxy pair is present. Preferably, connection interception between pairs of cooperating proxies is transparent to communication between the client and server. Transparency results when a client can act as if it is communicating directly with the server and the server can act as if it is communication directly with the client or when conditions are such that modifications or configuration are not required at the client or the server to accommodate the use of proxy pairs.

The proxy pairs are not limited to a homogeneous enterprise network, and can be used and deployed in configurations where administrative boundaries are traversed. One advantage of this approach allows auto-discovery of such device relationships without requiring any explicit configuration to interconnect devices in distinct administrative domains. For example, proxy devices could be placed within the data centers of one or more popular Web sites and within the access networks of one or more Internet service providers. In this way, connections from clients attached to the enabled service-provider network to enabled Web sites are intercepted and processed by the SP (in the Web site data center) and the CP (in the access network). Likewise, if two or more enterprises deployed these devices in their network infrastructure, then client-server connections traversing extranets of two enterprises that were enabled with such devices would have such connections proxied and processed. In both cases, when the client-server connection does not terminate at a proxy-enabled site (or originate from a proxy-enabled site), then the traffic would not be processed and would not be in any way adversely impacted.

Figure 3:
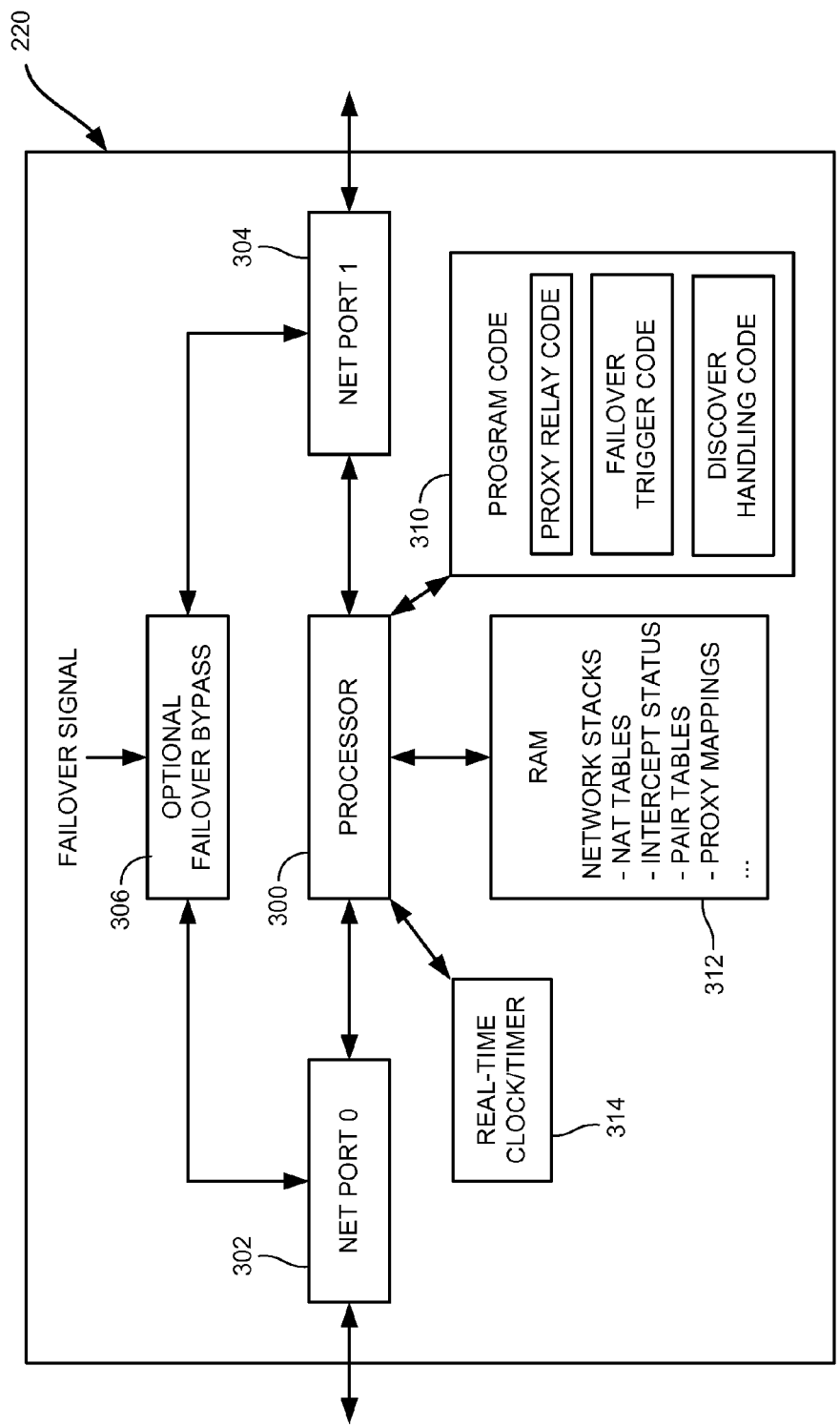
FIG. 3 is a schematic diagram of a proxy device as might be used in the networked systems shown in FIGS. 1-2.

FIG. 3 shows details of one example of a proxy device 220 as might be used in the systems described above. Proxy device 220 is shown comprising a processor 300 that interfaces to the network via network ports 302 (Port 0), 304 (Port 1). Also shown is an optional failover bypass module 306, program code 310 for holding code representing various functionality, random-access memory ("RAM") 312 for maintaining data structures used by processor 300, and a real-time clock/timer 314.

In a typical operation, proxy device 220 receives a packet at port 0, processor 300 might perform some processing, and the original packet or a modified packet is sent out on port 1. In response to a failover signal, such as a signal indicating that processor 300 is inoperative, optional failover bypass module 306 might receive packets at port 0 and output those packets unchanged at port 1 and receive packets at port 1 and output those packets unchanged at port 0.

Failover bypass module 306 might be a dual-port Ethernet NIC with a failover capability. The NIC allows proxy device 220 to be inserted into the path of a 100BaseT or GigE connection, for example, and act as a transparent Ethernet relay. The proxy device can be inserted into the path between a WAN router and a LAN switch simply by unplugging the router from the switch, plugging it into one of the proxy device ports (e.g., port 0, port 1, etc.) and plugging the other NIC port into the LAN switch. In normal operation, traffic that is not intercepted by a proxy module would be simply forwarded out the adjacent interface by a kernel interrupt handler, much like an Ethernet bridge. Traffic that is processed locally is intercepted by proxy device kernel module and delivered to a local proxy handling process running in user space.

One potential limitation of this approach is that the device is now in the critical path of the network and represents a single point of failure. To address this issue, the dual-port NIC includes a failover mechanism that allows the NIC to automatically bypass the host under exceptional conditions. In particular, the NIC might include a physical bypass circuit built from mechanical relay switches that can short-circuit the two ports into a cross-over configuration in the absence of a signal (such as a heartbeat signal) indicating that the device is operative to process data. In normal operation, the relays are engaged and packets are processed by the host. If such packets are part of an optimized connection, they are diverted to the engine process on the local host. Packets that arrive at the host but are not part of an optimized connection are simply relayed across the NIC to the adjacent port. However, when an exceptional condition arises (software crashes, power fails, etc.), the relays become disengaged. As a result, the two Ethernet cables that are plugged into the NIC become physically interconnected in a cross-over configuration. A software crash is detected by the NIC using a hardware watchdog circuit on the board. If the watchdog circuit is not reset every second or so by the system software (i.e., because the software fails or the operating system crashes), then the NIC disengages the relays, which bypasses the device even if the power remains on.

Given the proxy device's in-path vantage point, it is able to transparently intercept any traffic that it desires. Toward this end, an operator configures the device with the TCP/UDP port numbers and/or application types that are to be intercepted and optimized. All traffic types that are not so configured are simply passed through the device unmodified. Connections that correspond to traffic types that are configured for interception are processed by elements that terminate the transport connection locally and process the client-server protocol messages using techniques described herein or their equivalent. Support for each application/protocol type can be thought of as a "software blade" that is installed in the proxy device.

Figure 4:
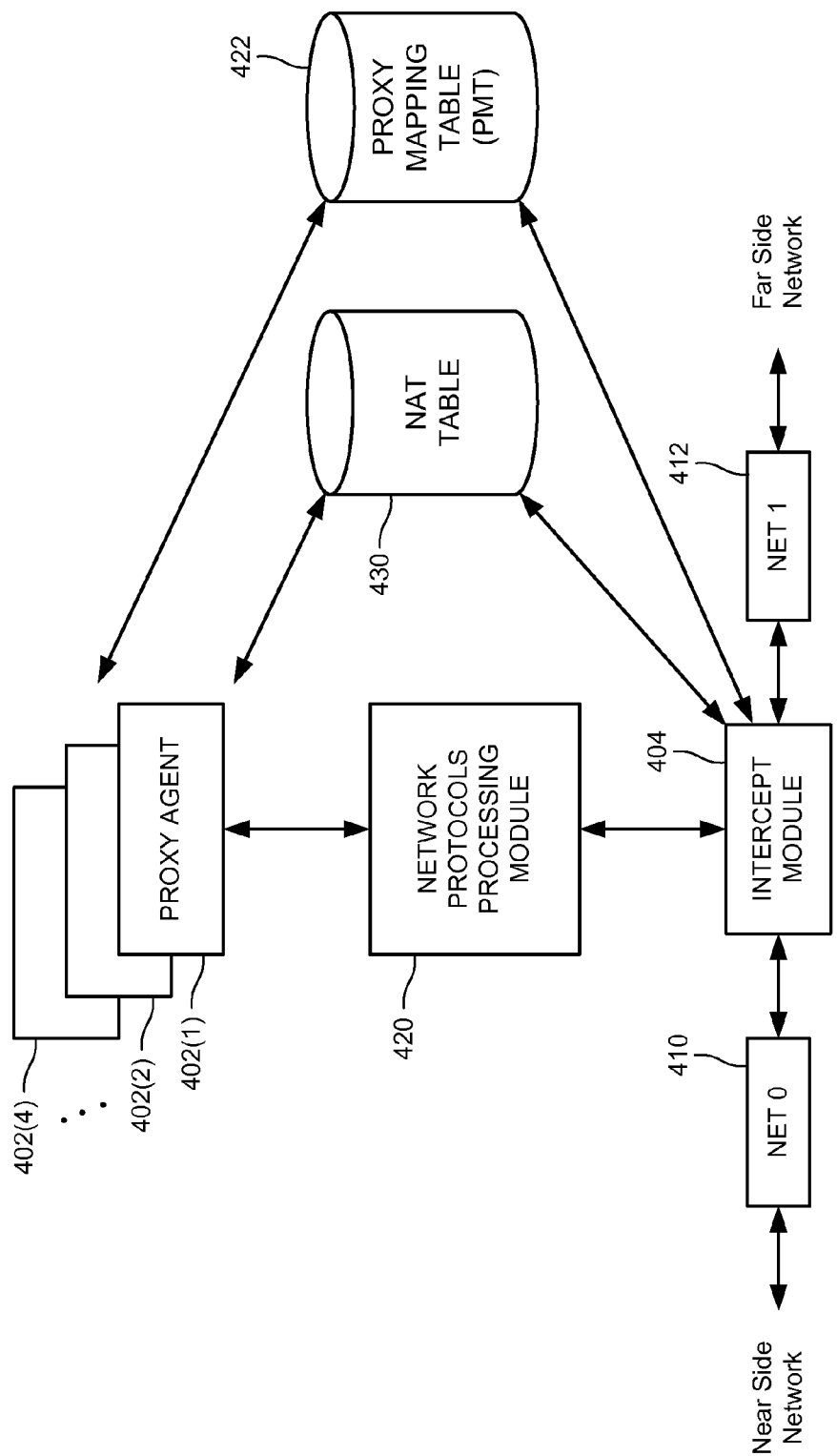
FIG. 4 is a schematic diagram of the proxy device shown in FIG. 3, in terms of modules and storage components.

FIG. 4 is a schematic diagram of proxy device 220 shown in terms of modules and storage components. In a typical embodiment, the modules and agents might be implemented a using code from program code 310 and storage components might be implemented as data structures in RAM 312. In the example shown, proxy device 220 functions as a Layer 2 relay. FIG. 4 shows a set of proxy agents 402, an intercept module 406, a network protocol processing module, and network ports 410, 412. Optional failover components might be present, but are not shown in the figure. Among the data storage structures illustrated, a proxy mapping table ("PMT") 422 and a NAT table 430 are shown. The network protocols processing module 420 implements the end-host versions of traditional network and transport protocols like the IP, TCP, UDP, and so forth.

The two network interfaces 410, 412 cooperate through the intercept module. Intercept module 404 performs an operation akin to that of a two-port bridge—packets that arrive on one interface are forwarded out the other interface. Unlike many bridge devices however, proxy device 220 is configured with a network address and as such, has a presence on the network and can be communicated with directly. Network interfaces 410 and 412, on the other hand, are not assigned network-level addresses but, as usual, are assigned link-level addresses for sending and receiving packets over the attached LAN. When a packet arrives on either of the two network interfaces, if the packets are addressed to the proxy device 220—i.e., the address assigned to proxy device 220 is the same as the destination address of the arriving packet—then intercept module 404 directs the packets to the network protocol processing module 420. Packets that originate from within a process or module inside proxy device 220 are transmitted out one or both of the network interfaces. In addition, intercept module 404 may alter the normal packet processing to cause traffic to be intercepted and delivered to a local proxy agent, when in fact, the traffic was originally addressed to some other end host.

A proxy agent 402 is instantiated as the terminus point for the client and server connections that are intercepted by proxy device 220. Alternatively, one global proxy agent might handle all proxy agent functions regardless of the number of connections handled. While exceptions might be possible, it is expected that one proxy agent would be instantiated for each proxy pair of which proxy device 220 is a member and there is a one-to-one correspondence between proxy pairs and connections handled. Intercept module 406 includes logic to divert some network traffic to one of the proxy agents, which may in turn make additional network connections to other hosts to handle the network traffic. Intercept module 406 may also modify packets and forward those packets out the host, as described below. When a proxy agent makes additional network connections to other hosts or other proxy devices, it may consult PMT 422, which maps server addresses to one or more nearby proxy addresses. This allows the proxy agent 402 to determine the server-side proxy to communicate with for the client-server session that it processes. Proxy agent 402 might also consult NAT table 430 to determine the original destination or source address of packets (or of the connection end-points that carry the packets) if they had been rewritten.

The entries in PMT 422 could be manually populated by an operator using explicit knowledge of the deployment. However, while such manual configuration provides a great deal of flexibility, it also burdens the operator not only with a fairly complicated setup process, but also requires constant maintenance of these tables as the server and network infrastructure evolve. A better approach is to automatically discover the mapping as described herein. Performing such automatic discovery can be done without introducing any extra connection setup delay (for both intercepted as well as nonintercepted traffic). Thus, the entries in PMT 422 may be populated by intercept module 406 using methods described later.

Intercept module 406 manages and utilizes NAT table 430, which contains network address translation rules that are used to modify packets accordingly.

In one embodiment of a proxy device, the proxy device is realized from a general-purpose computer running a standard operating system such as the Linux™ or Microsoft Windows® operating systems with extensions. As a standard computing host, the proxy device's operating system kernel might implement a standard network stack, with intercept module 406 added as extensions to the kernel environment. The proxy agents might run as user processes, with intercept module 406 using techniques described herein to divert client and/or server connections to a proxy process.

Figure 5:
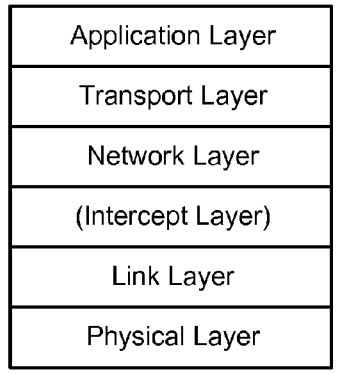
FIG. 5 is a layer diagram illustrating a position of an intercept layer.

FIG. 5 is a layer diagram illustrating a position of an intercept layer in a network stack that could be implemented in the client and server end hosts. In this case, the only packets that are processed by the host are those that are addressed to it. This particular example shows the intercept module as a part of the network stack integrated between the link layer and the network layer. Thus, much as in the deployment described in FIG. 4, the intercept module has the opportunity to examine and potentially modify packets before they are processed by the network layer. This deployment scenario assumes that the client and/or the server would be configured with whatever functionality a proxy would be performing. As such, the proxy agent is not a separate process but is shown as a part of the client/server process running as an application on the host. Furthermore, the end-host implementation could be combined with the network device implementation in a hybrid configuration.

Probe Query

Figure 6:
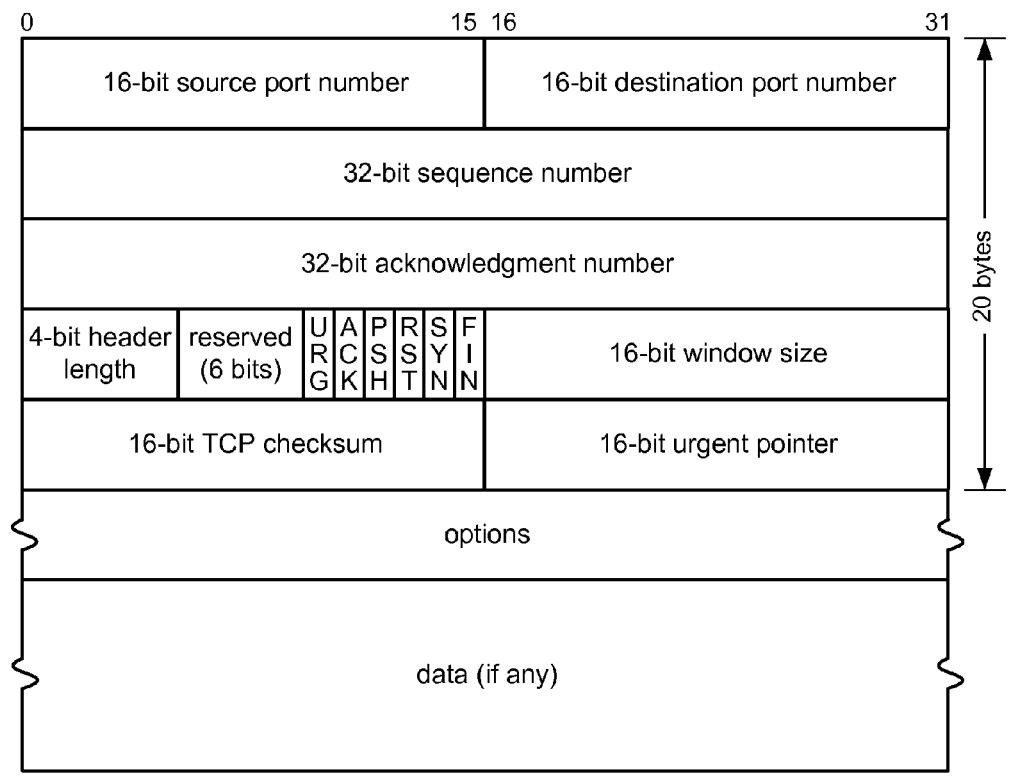
FIG. 6 is a schematic diagram of a packet including optional fields for signaling, and proxy devices.

FIG. 6 is a schematic diagram of a packet including optional fields for signaling, and proxy devices as might be used for probe queries and probe responses. Probe queries as described herein are one method or apparatus for signaling the presence of a proxy to other proxies. Probe responses as described herein are one method or apparatus for return proxy signaling in response to proxy signaling.

As shown in FIG. 4, a proxy device includes two network ports (and might have more, unshown ports). For a transaction, one network port is associated with a client direction while the other network port is associated with a server direction. The proxy device treats the first network port as the source of packets from the client and treats the second network port as the source of packets from the server. For sending packets towards the client, the proxy device uses the first network port and for sending packets towards the server, the proxy device uses the second network port. While a particular network port might be towards a client for one transaction and towards a server for another transaction, the term "client port" used with reference to a connection or transaction refers to whichever port is being used to interface, directly or indirectly, towards the client and the term "server port" refers to the other port that is being used to interface, directly or indirectly, towards the server. Also, when and if the proxy device does not know the port that is toward the client or toward the server, it may send a copy of the packet out both ports.

Upon receipt of a packet from the client port where the proxy device is a CP for the transaction associated with the received packet, the intercept module determines what actions to take on the received packet. If the PMT does not have an entry for a destination server associated with the destination found in the received packet, the intercept module attempts to learn whether or not a corresponding SP exists on the network path, and if so, its network address.

To detect and identify an SP, the CP's intercept module constructs a probe query packet and transmits that packet towards the server. The CP can then determine, based on the events that occur after sending the probe query packet, whether or not there is an SP on the network path. Likewise, even if the PMT has a mapping for a particular destination server available and a connection request for that server is received, the CP intercept module optionally generates a probe query packet to refresh the mapping. Optionally, as described later herein, the intercept module may decide to handle the connection in other ways, rather than probe for a server side proxy, based on user configuration.

In preferred implementations in particular networks, the CP constructs a probe query packet by attaching a probe query option to the network or transport layer options portion of the connection request packet as illustrated in FIG. 6. This allows optional messages to be piggybacked on an existing packet. Often, these optional messages are simply called "options". The CP makes use of options data by attaching a new option to the list of options that is already present in the packet, thereby advertising its own existence on behalf of the client. The option code is an assigned number that uniquely identifies the option as being a probe query. The CP may store some state in the PMT indicating that a probe has already been sent for the given server.

After appending the option code, the probe query packet is forwarded along the network path towards the server by the normal network delivery process. If an SP exists along this path, it detects the presence of a probe query option in the packet. The detecting SP then transmits a probe response back towards the client, expecting that this probe response will be detected by the CP. By sending this probe response, the SP informs the CP of its own existence, including related contact information (e.g., its network address and a transport port). In addition, after sending the probe response, the SP might not forward the connection request packet towards the server, instead dealing with it locally. Because the SP knows that a proxy pair can be formed with it and the signaling CP, the SP expects that the CP, upon receiving the probe response packet, will intercept and proxy the connection. With the CP proxying the connection, the client's connection request packet should not be forwarded to the server, which would respond by establishing a connection with the client. Instead, the SP will establish a connection to the server as needed.

One advantage to this approach is that if there is no SP on the path between the CP and the server, the modified connection request packet (i.e., the original packet with the appended probe query option) is received by the server host. According to the network and transport protocol specifications, unrecognized options are ignored by participating hosts. Thus, when a server receives a modified connection request from a client, the probe query option is ignored and a connection response packet is sent to the client, establishing a network session with the client exactly as if no probe option were present in the connection request. Additionally, when the server sends a connection response packet along the network path towards the client, the response passes through the CP. The CP can thereby implicitly detect that there is no SP on the path towards that particular server and can act accordingly. For example, the CP can just forward traffic or take other actions that do not require a proxy pair, or other actions as described herein.

Other embodiments of the probe query mechanism may be realized as well. When the CP intercepts a connection request packet, instead of modifying the packet and appending a new option code, it could stall the packet and instead send a probe query packet of any form towards the server. For example, this alternative probe query could simply be a new TCP connection request packet on a well known port that is intercepted by all SP agents. The CP then waits for a certain amount of time, expecting to receive an acknowledgment of whether or not there is an SP in the transport path towards the server. If an SP responds to this connection request, the CP knows that it can intercept the connection, and as such, forwards the stalled connection request packet to the NAT system and then to the local agent process. If the CP receives a negative acknowledgement, or does not receive an acknowledgment by a certain time threshold, it concludes that there is no SP in the path, and the stalled connection request packet is forwarded to the server unmodified.

In another embodiment, the CP sends the original connection request in parallel with a new query packet. This has the benefit that no connection requests are ever delayed as a result of the probing operation, yet also means that a connection request may pass through two proxies without being intercepted. However, the results of the probe query process could be used for future connection requests, so only the first connection attempt ends up being passed through unmodified.

Probe Response

As described above, if there is an SP in the path from the client to the server, then that SP should intercept probe query packets coming from the CP and send a probe response of some form, indicating to the CP its own existence and contact information. In the preferred embodiment, the probe response packet is constructed as a modified connection response packet that corresponds to the modified connection request packet. The SP also makes use of the options portion of the packet header, adding a probe response option conveying its network address and transport port information in the option data.

As the probe response packet is a simulated connection response packet, it is sent on the network with a source address corresponding to the server and a destination address corresponding to the client. The packet is then sent on the reverse path (i.e., towards the client) in lieu of sending the connection request to the server. Assuming the network paths are symmetric, the client-side proxy detects this response packet and acts on it. In other embodiments, the probe response is a special response packet sent from the SP to the CP communicating the SP's contact information as well as whatever other information might be helpful in allowing the proxies to coordinate and cooperate with one another. For example, the SP may include a list of addresses of other candidate server-side proxy devices to clustering and/or load balancing, as described later.

The CP acts on a response packet by updating the PMT with a new map entry indicating that for the given destination server (and possibly port), there is an SP in the path. The SP contact information is extracted from the probe response and installed in a mapping entry. In addition, the CP installs an entry in the NAT table that rewrites the IP destination address with the local proxy IP address for all packets corresponding to the client-server session in question.

In the first embodiment above, when receiving a probe response packet, the CP reconstructs the original connection request packet from the probe response packet that was derived from the probe query packet. Then, because a NAT table entry now exists for the client-server connection in question, the original connection request is then forwarded to the local proxy agent. As described below in more detail, the CP communicates with the SP to establish a proxied connection between the client and the server, making use of NAT tables to operate transparently.

If the CP observes a connection response coming from the server without the SP signaling for a connection that the CP signaled towards the server, the CP can conclude that there is no SP in the path. Alternatively, other implicit tests might be employed, such as relying on a timer, waiting for a future connection request from the same client, or other techniques. However, if the CP concludes that a SP is not present, or a previously detected SP is no longer present, the CP updates its PMT with this new information by installing a map entry for the destination server indicating the absence of a proxy (setting the entry to "no-proxy").

The mapping entries that are dynamically added to the PMT may become inaccurate over time. For example, a route in the underlying network might change so that the SP on the path for a particular server S may no longer be present on that path. Likewise, a CP could be installed and enabled before its corresponding SP is installed; then, once the SP is installed, the CP will erroneously assume the SP is not present as an entry indicating so is in the PMT. To handle this consistency problem, some embodiments of proxy devices occasionally (such as periodically according to a timer) refresh map entries in the PMT.

Logically, each map entry might have a refresh timer associated with it. When the timer expires, a probe is proactively sent toward the server in question to determine if the corresponding SP is still present on the path (or if a different SP happens to become present). Alternatively, the mapping entry could be simply removed from the PMT, as a subsequent connection request would simply result in a new probe. This timer based approach could be optionally complemented with a connection driven approach. With a connection driven approach, each time a connection request is processed, a probe is proactively sent toward the server in question to determine if the corresponding SP is still present on the path.

Actions Taken by an Intercept Module

Figure 7:
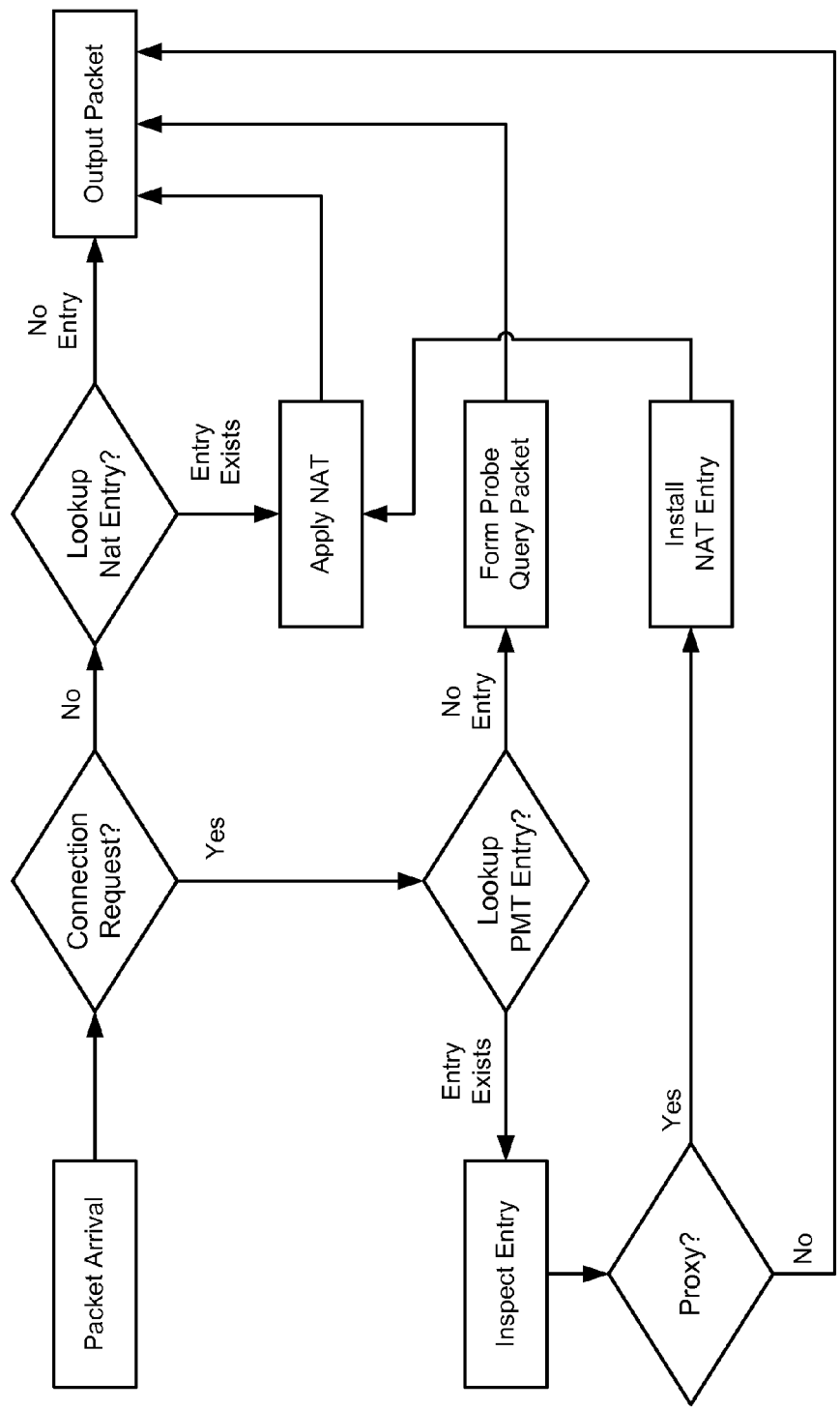
FIG. 7 is a flowchart illustrating actions taken by an intercept module when a packet passes through a proxy device.

FIG. 7 is a flowchart illustrating actions taken by an intercept module when a packet passes through a proxy device. The flowchart elements correspond to major components of an intercept module and the various operations and decisions that are made as a packet traverses through the intercept module. The description immediately below is generally from the point of view of the client-side proxy. The actions of the server-side proxy are described further below. This flowchart is merely illustrative as the functionality embodied herein can be accomplished by variations in these steps whereby such steps might be reordered, processed by different modules, and so forth.

In general, when a packet arrives on one of the proxy device's interfaces, the intercept module examines the packet to determine if it is destined for the local host (i.e., it is addressed to the local proxy device or it is a broadcast or multicast packet). If so, the intercept module passes the packet to the local network stack. Otherwise, the intercept module examines the packet to determine if it is a connection request packet. The exact semantics of what determines a connection request packet depend on the network and application protocols that are being proxied.

For example, in TCP, a connection request is noted by the presence of the "SYN" bit in the flags field of the TCP protocol header. Other applications may use a protocol such as UDP, which does not define specific connection semantics. In this case, the first packet of a UDP flow can heuristically define the start of a connection, where a UDP flow may be defined as all packets with a common source network address, destination network address, source UDP port, and destination UDP port. Likewise, the end of a connection can be implied by the absence of packets from a flow for a certain amount of time.

For connection request packets, the intercept module determines whether and through where the connection should be proxied. To do so, the intercept module builds and maintains the proxy mapping table (PMT). This table tracks the network addresses of proxies that are situated on the path to a particular connection destination (i.e., server). That is, in order to proxy a connection for a particular server S from the CP through an SP to S, the proxy agent in the CP maps the address of S to the address of SP, and the PMT provides this capability.

Each packet is also checked against the NAT table 430 to determine if the network addresses and/or transport ports of the packet should be rewritten. NAT protocols and processes are described in Request for Comments (RFC) 1631, which is generally available and is incorporated herein by reference for all purposes, though NAT is employed herein to facilitate connection interception rather than providing address-translation between private and public networks. The entries in the NAT table match the endpoints of an established network connection, i.e., they specify the transport protocol, the source address/port and the destination address/port. If the packet's address and port information match an entry in the NAT table, then the destination address of the packet is rewritten to be the target address listed in the table, which in the case of input packets, is the local address of the proxy host, and the packet is forwarded to the local network stack, where it is intended to be received by a local proxy agent. Because the address has been rewritten and the proxy agent does not have access to the old address (but may require it to perform its function), the proxy agent can query the NAT table to determine the original destination of the packet (i.e., the destination address of the packet before its destination address was rewritten). This mechanism causes the client to believe that it has a connection established with the original server even though the connection is terminated at the local proxy agent in the CP.

The intercept module also receives each packet that is sent from a proxy agent on the local host and NAT table 430 is similarly consulted when packets are sent from the proxy host towards the client or server. In other words, packets that originate from a local proxy agent are checked against the NAT table to determine if the network addresses and/or transport ports of the packet should be rewritten. Unlike prior art methods for proxying transport connections, this mechanism causes the server to believe that it has a connection established with and addressed to the original client even though the connection is terminated at the local proxy agent in the SP. This contrasts with a Web proxy, for example, where the proxy creates a connection with the server and the server terminates a connection from that proxy and the proxied client address or addresses are ultimately invisible to the server.

Through the use of NAT in this fashion, the CP proxy agent establishes a network connection with the client such that the client believes it is communicating with the server, and correspondingly, the SP proxy agent establishes a connection with the server such that the server believes it is communicating with the client, where belief is sometimes represented simply as acting as if that were the case and having operations proceed normally as they would if the believed fact were true.

A packet that is not a connection request and that does not match an entry in the NAT table is simply forwarded unmodified to the interface opposite of where the packet originally arrived, thus providing a transparent relaying function for traffic that is not to be proxied. This traffic includes packets such as link-level broadcast or multicast packets, as well as packets that are not to be proxied because the probe mechanism described herein did not discover a second proxy device on the path to the server.

Given the PMT and a new connection request, the intercept module looks up the destination address of the connection request in the PMT. If the PMT indicates that there is a corresponding proxy on the network path, the intercept module proxies the connection to the local proxy agent by installing a new NAT rule for the connection in the NAT table. This ensures that future packets that are part of the connection are forwarded to the local proxy agent. The connection request packet itself is then sent through the NAT operation and thereby forwarded to the local proxy agent, which establishes a new connection with the client. Because of the NAT operation, the CP establishing this connection with the client appears to the client as if it were the server.

In the above-described example, because the connection is terminated at the local proxy agent, there is a chance the connection is set up successfully even though the server may have crashed or otherwise would refuse the connection from that particular client. To deal with that condition, the CP might delay the establishment of the client-to-CP connection until the SP-to-server connection has succeeded. This can be accomplished by having the CP delay the acknowledgement of the connection request (e.g., in TCP, by delaying the transmission of the SYN-ACK packet) until a message is received from the server or SP indicating that the SP-to-server connection has been successfully established. If the SP-to-server connection fails for some reason, the SP notifies the CP and the CP then resets the pending connection (e.g., in TCP, by sending a reset packet back to the client).

If a probe attempt determined that there is no SP on the path to the server, the PMT stores a "no-proxy" map entry indicating that this probe attempt failed. When a connection request for the server is looked up, the no proxy disposition informs the proxy device to avoid proxying the connection and instead, the connection request packet is simply forwarded unmodified towards the server. Because no NAT is configured for this connection, all remaining packets for this connection are bridged without modification.

Connection Interception

As mentioned above, when a connection request packet arrives at a CP and the PMT has a map entry corresponding to the destination server in the connection request packet, then the connection request packet is forwarded to the local proxy agent on the CP. Due to the NAT table in the CP, the proxy agent establishes a connection with the client such that the client believes it is communicating with the server. The CP proxy agent then establishes a connection of some form with the SP, which is identified by consulting the PMT using the server destination address of the original client connection. This may be a new network connection from the CP to the SP, or a new virtual channel representing the client-server connection multiplexed over an existing network connection between CP and SP. In the virtual channel case, messages from various client-server sessions between common CP/SP pairs can be multiplexed onto a single transport connection or virtual channel. Each message includes a header that identifies the client-server session. When a message is received at the CP, the header and the message are transmitted over the virtual channel to the SP, which decodes the header, reads the message, and forwards it onto the appropriate server connection.

When the SP receives the new connection (or virtual connection) from the CP representing the client-server connection, the CP sends the SP a message informing the SP as to which server and port the original client connection should be sent. The SP, in turn, installs an entry in the NAT table that maps the source address of the forthcoming SP-to-server connections to the original client address. Then, the SP initiates a connection to the target server and port, and by virtue of the NAT, a connection is established between the server and the SP such that the server believes it is communicating directly with the original client.

Figure 8:
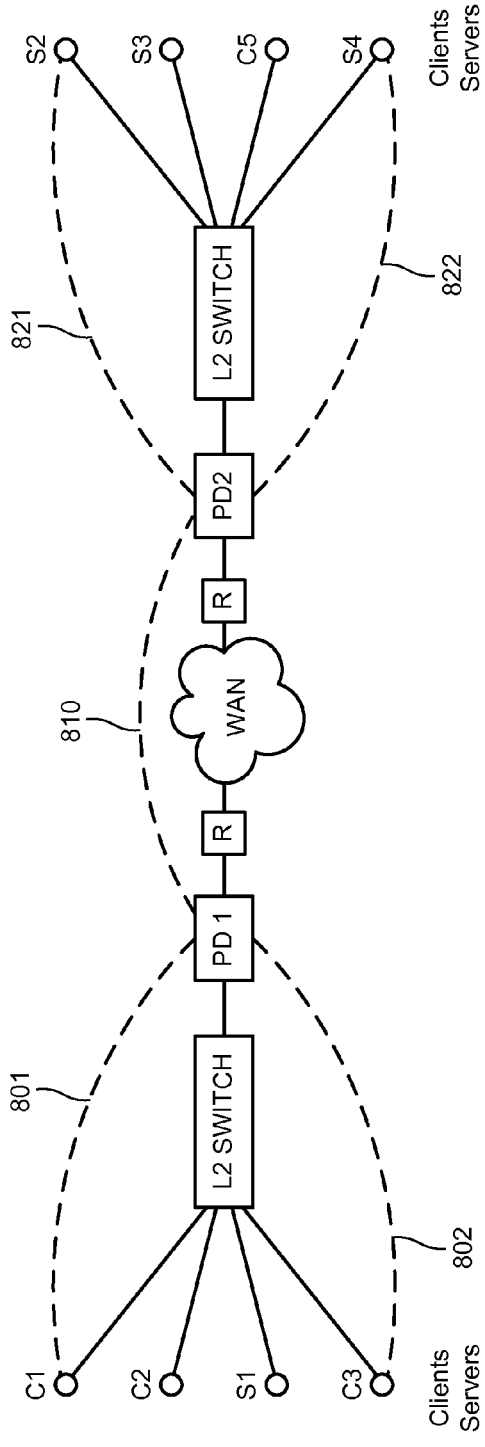
FIG. 8 is a diagram illustrating multiple connections used for interactions between clients and servers over a WAN.

FIG. 8 is a diagram illustrating this multi-connection approach used for interactions between clients and servers. As shown there, several clients and/or servers are coupled to and L2 switch that is in turn coupled to a first proxy device PD 1. Proxy device PD 1 is coupled, via routers and a WAN, to a second proxy device PD 2. Proxy device PD 2 is in turn coupled to a second L2 switch that serves another set of several clients and/or servers. Proxy device PD 1 is a CP and proxy device PD 2 is an SP for the example transactions shown, but it should be understood that a proxy device could be a CP and an SP at the same time for different transactions. The proxy devices might execute the auto-discovery protocols described herein, or are otherwise configured to be aware of each other.

Various network connections are illustrated by dashed lines. Suppose client C1 desires a connection to server S2. The connection is transparently intercepted such that client C1 ends up with a transport connection 801 terminated at the CP, but because of NAT, client C1 cannot tell that it is not in fact communicating directly with server S2. Likewise, as part of the process, the CP establishes a different transport connection 810 between itself and the SP.

In turn, the SP establishes a transport connection 821 that corresponds directly to the client's transport connection 801. Because of NAT, server S2 cannot tell that it is not communicating directly with client C1.

Then, whenever client C1 sends a message over connection 801, the CP relays it over connection 810 to the SP, which relays it over connection 821 to server S2. Likewise, whenever server S2 sends a message over connection 821, the SP relays it over connection 810 to the CP, which relays it over connection 801 to client C1.

If another client, C3, initiates a transport connection to another server, S4, the connection is transparently intercepted such that client C3 ends up with a transport connection 802 terminated at the CP. Because of NAT, client C3 believes it is communicating directly with server S4. Likewise, as part of this process, the CP can reuse the transport connection 810 between itself and the SP to handle messages between client C3 and server S4. In turn, the SP establishes a transport connection 822 corresponding directly to the client connection 802, and because of NAT, server S4 believes it is communicating directly with client C3.

Following that setup, whenever client C3 sends a message over connection 802, the CP relays it over connection 810 to the SP, which relays it over connection 822 to server S4. Likewise, whenever server S4 sends a message over connection 822, the SP relays it over connection 810 to the CP, which relays it over connection 802 to client C3.

Because connection 810 is used by both the C1/S2 session as well as the C3/S4 session, a method for associating data transmitted over that connection to the appropriate session must be employed. As described earlier, this can be accomplished by including a header with each transmitted message that indicates the client-server session associated with the transmitted message.

Transparent interception is described above. Proxy devices might also use nontransparent interception. In nontransparent interception, the addresses of the proxy devices are exposed to the end devices. Thus, the address of the CP might be exposed to the client and the address of the SP might be exposed to the server, with each end device configured to talk directly with its corresponding proxy device client.

Certain protocols like CIFS, NFS, and HTTP are amenable to nontransparent operation as those protocols allow the client to communicate directly with an intermediary that has a different address from the origin of the communication. This architecture is feasible, but it can be challenging to deploy. There are many different approaches to solving the integration challenges of nontransparent configuration, but they typically require hard to maintain (either manually or automatically) mapping tables in the proxy devices. That is, in order for a client side proxy device to know what server side proxy device to connect to, it must somehow learn what server the client actually wants to communicate with (via protocol specific knowledge or some protocol specific mapping model), and in turn, must learn what server side proxy device is near the server in question. This is in general complex and cumbersome, except for protocols like HTTP that were explicitly designed to allow a client to connect explicitly to a proxy and have the client include the server's name in every header of every request message. Thus, where there is some advantage to nontransparent operation and it is feasible, it can be used instead of the transparent interception described herein.

In other cases, a hybrid configuration is desirable, where transparency is used at the CP but not at the SP. In this configuration, the server side NAT is not employed alleviating the requirement that the server side proxy be in the direct network path. This is a benefit in the data center, where very high bit rates might be concentrated onto one or two primary network links.

Transport Optimization

Once a proxy pair is established, there are number of possible actions that the proxy pair could take. Some of those actions might involve optimizing the transport. While there are a great many optimizations that may be carried out with a proxy pair, one particular mechanism involves transport protocol optimization whereby the client and servers implement legacy transport protocols while CP-to-SP connections are supported with more modern or otherwise optimized transport protocols. In this fashion, the client and server may implement legacy versions of transport protocols across a LAN, where protocol performance is not necessarily crucial, while enjoying the protocol enhancements of a different transport protocol between and among proxy agents.

In one embodiment, this transport protocol translation is applied to TCP, wherein two TCP end points believe they are speaking to one another by virtue of the transparent interception. The CP-to-SP protocol can be virtually any protocol mechanism that allows the proxies at both ends to emulate the reliable, in-sequence delivery semantics of TCP. One such approach is to implement a modified form of TCP for the CP-to-SP protocol that implements the reliability semantics of TCP but enjoys different congestion control dynamics. Congestion control refers to methods that networks use for discrete network connections to parcel the available network bandwidth on a shared network link. One aspect of TCP's congestion control algorithm is the notion of "slow start", whereby a TCP connection slowly increases the amount of bandwidth available to an application to avoid flooding a potentially constrained link with data. The main drawback to a slow start TCP connection is that an application that has a short lived connection may never reach the full link capacity since the slow start mechanism does not complete its ramp up before the connection is no longer needed.

With a pair of proxies in the network path, it is possible to intercept a number of TCP connections and multiplex them over a single long-lived connection between the two proxies. This long-lived connection would be able to avoid the problems of slow start, even if each individual connection is short lived. In addition, it is possible for the two proxy hosts to employ more sophisticated congestion control algorithms for the multiplexed connection channel, which can result in better performance for the set of proxied connections.

Other enhancements can be made to the congestion control algorithm in the CP-to-SP connection, such as those described in Floyd, S., "HighSpeed TCP for Large Congestion Windows", IETF Internet Draft draft-floyd-tcp-highspeed-02.txt (Feb. 20, 2003) [available at http://www.ietf.org/internet-drafts/draft-floyd-tcp-highspeed-02.txt] (hereinafter "Floyd"). Techniques described in Floyd change the TCP congestion control dynamics to provide significant performance enhancements in high-latency environments and have a number of other benefits.

Multi-Hop Automatic Proxy Path Discovery

Figure 9:
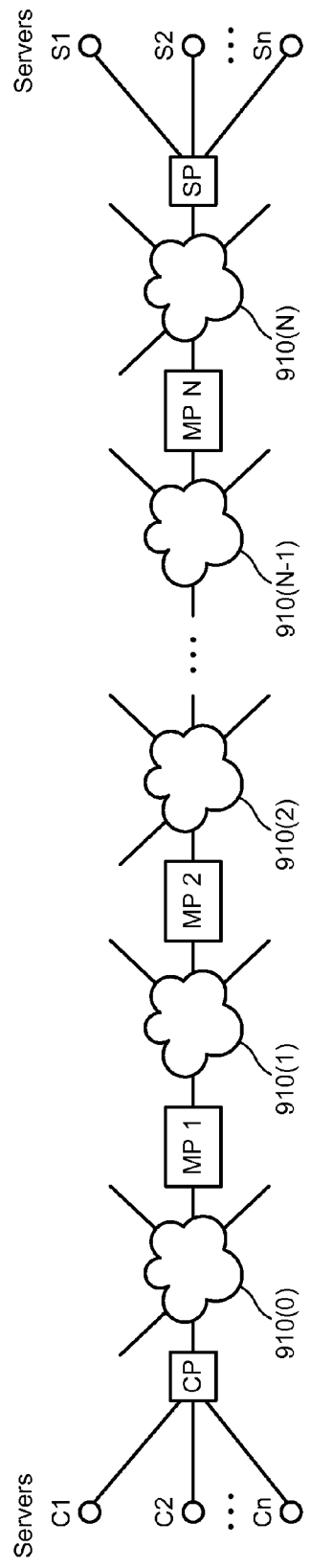
FIG. 9 is a diagram illustrating the use of more than two proxy devices in a network path, including a client-side proxy, one or more middle proxies, and a server-side proxy.

FIG. 9 is a diagram illustrating the use of more than two proxy devices in a network path, including a client-side proxy, one or more middle proxies, and a server-side proxy. While most of the examples used so far presume a configuration comprising a pair of exactly two proxies (one named "CP" near the client and one named "SP" near the server) and three transport connections (i.e., one between the client and CP, one between the CP and the SP, and one between the SP and the server), the present invention also encompasses topologies containing more than two proxies and more than three transport connections.

As shown in FIG. 9, a client-server connection may be transparently intercepted, processed and proxied via a sequence of more than two proxy devices. As shown there, a client communicates with a server via a connection to a client-side proxy CP, which in turn communicates through a network 910(0) with a first middle proxy MP 1, which in turn communicates through a network 910(1) with a second middle proxy MP 2, and so on to an N-th middle proxy MP N, which in turn communicates through a network 910(N) with a server-side proxy SP, which ultimately communicates with the server. In this example, multiple clients and multiple servers are shown. As explained above, it need not be the case that the clients are all at one end and the servers are all at the other end. Thus, the CP might be a proxy device that also is an SP for other connections and the SP might be a proxy device that is also a CP for other connections. As illustrated, networks 910 include other connections and branches.

In this embodiment wherein more than two proxy devices are in the network path and are to be active for a client-server connection, a proxy device discovers whether it is acting as a client-side proxy by, among other techniques, detecting the absence of proxy signals or probes and discovers whether it is acting as a middle proxy or a server-side proxy by forwarding probe packets on to the server while simultaneously sending a probe responses to the CP (or a downstream middle proxy). As a result, each proxy device will either see a connection request acknowledgement returned from the original server or a probe response packet coming from another proxy upstream on the path toward the server. In the former case, the proxy determines that it is an SP and acts accordingly (e.g., installing the server side NAT state and so forth). In the latter case, it determines it is a middle proxy and acts accordingly (e.g., by relaying messages from the client in question to the upstream proxy in question and vice versa from the server to the client and performing other actions expected of a middle proxy).

Throughout this disclosure, where there are multiple instances of an object and the number of instances is not critical, the instances are numbered from "0" or "1" to "N" with the understanding that the value of "N" need not be identical from use to use. For example, "N" is used as the number of clients, servers, proxies, etc., in various places, but that number might vary from example to example. It should also be understood that nothing here requires that all instances be used. For example, FIG. 9 shows clients C1, C2, . . . , CN, servers S1, S2, . . . , SN, and middle proxies MP 1 through MP N. It should be understood that the number of clients, servers and middle proxies need not be identical and the actual number is not essential to an understanding of what is being shown.

Variations

With a proxy pair in place, a number of advantages accrue and other network improvements are made possible. For example, using techniques described herein, a network administrator can deploy a proxy pair that would transform and proxy all TCP connections using techniques described herein. This can be done without requiring an upgrade of every device, server, and application that uses TCP with modern protocol enhancements to improve performance. WAN performance of all applications can be improved with the simple and straightforward deployment of such devices at appropriate points in a network infrastructure.

In some embodiments, messages are actually modified to provide additional performance benefits. For example, client-server transaction acceleration techniques as described in McCanne I can be implemented to transform network transactions for wide-area bandwidth optimization. Similarly, client-server transaction prediction mechanisms as described in McCanne III can be employed in a pair of proxy agents to mask effects of wide-area latency and thus provide significant reductions overall latency leading to increased client-server performance.

Connection Request Filtering

In some embodiments, the basic proxy discovery and interception mechanisms described herein can be extended with a configuration capability that targets only certain subsets of traffic. For example, a network operator may want to configure the proxy devices to process certain types of client-server connections but to pass through other types of client-server connections unmodified without interception and/or other processing. Specifically, it may be desirable to statically configure some information into the intercept module that alters its behavior based on the protocol or application type of the underlying connections.

One simple addition to the intercept module is the addition of rules that indicate certain actions to take on a class of connections. One type of rule would indicate different actions based on the destination port in the connection request packet. With this addition, the intercept module can choose to ignore connection request for particular configured ports, or alternatively, only act upon connection requests for particular configured ports. More generally, the rule could be a packet filter that is applied to the connection request packet, e.g., specified as a BPF packet filter (McCanne and Jacobson, "The BSD Packet Filter: A New Architecture for User-level Packet Capture", In Proc. of the 1993 Winter USENIX Technical Conference, San Diego, Calif., January 1993). Using the approach described there, whenever the intercept module processes a connection request packet, it could apply one or more packet filters to determine if the connection request should be passed on unmodified, intercepted and processed, or even dropped.

By dropping a connection request packet, the intercept module would implement functionality akin to a firewall, whereby certain connections are allowed to pass through, while others are denied. The fact that the PMT contains dynamic information resulting from the probe operation enables even more sophisticated functionality than available with a simple firewall.

For example, assume two proxies are cooperating to provide security functionality for the network traffic that traverses them, whereby the traffic that is proxied goes through an encryption/decryption process. The intercept module can be configured with a rule that dictates that all traffic should be intercepted if possible to discover whether or not there is a corresponding proxy and any packets destined for servers that do not have a corresponding proxy in path should be dropped instead of forwarded. Using such a rule set, the dynamic mappings resulting from the probe process are used to indicate which connections should be dropped and which should be proxied.

Static Mapping

Static mappings are useful, for example, where the CP is in a network path but the SP is not in the network path. By adding static mappings to the PMT, via a manual network operator process or the like rather than being discovered through the probe process, the SP need not be on the path. The static mapping is marked accordingly so that the intercept module does not attempt to refresh the mapping. A static map entry is similar to a dynamically discovered entry in that it indicates the appropriate SP to use when contacting a particular server. The CP would still intercept network connections, but would not carry out the normal probe process to discover the SP and instead would be directed to the off-path SP (although nothing prevents a network operator from statically mapping an SP that is in the path).

On-the-fly Connection Interception

Some connections may become established before any proxy could intercept the connection requests. For example, a CP could be powered on and find itself in the path of existing connections. Another possibility is that the network path for a connection could change such that the new path flows through a proxy. It is desirable to intercept these pre-existing connections such that they gain all benefits of using the proxy service.

The intercept module can determine whether a packet flowing through it belongs to a pre-existing connection in several ways. One method is by tracking every connection that flows through it. When a connection request packet arrives at the intercept module, it can begin updating or creating state for that connection, including, but not limited to, the existence of that connection, whether the connection request succeeds, and when the connection is terminated. If a packet arrives for a connection for which the intercept module has no state, then it could conclude that this packet is for a pre-existing connection.

Once the intercept module identifies a pre-existing connection, it could further try to identify whether the connection flows through an SP. It could do this in several ways. One way is to examine a table of known destination to SP mappings; the table's entries could come from previous runs of the proxy discovery protocol, or via manual configuration, or via some other method. It could also attempt some form of proxy discovery protocol for the destination of the pre-existing connection.

Once the intercept module has discovered the peer intercept module on the other side of the pre-existing connection, it can take some action to cause the connection to be intercepted. One such action is to tear down the existing connection by injecting one or more "reset" packets into the client-server session. This will cause the connection to fail, and in some cases, the application will simply establish a new connection with the server automatically. When the new connection request flows through the CP, it can then go through the process described in earlier to cause the connection to be intercepted. Other applications may report an error to the user and halt the process when their underlying connection or connections fail. To address this, rather than reset the connection, the CP and SP can intercept the connection on the fly by observing the current protocol parameters in the active session (e.g., sequence numbers, advertised window, and so forth) and recreate the necessary protocol state within the proxy device along with the appropriate NAT rules to cause the connection to be intercepted midstream.

Connection Deflector

Figure 10:
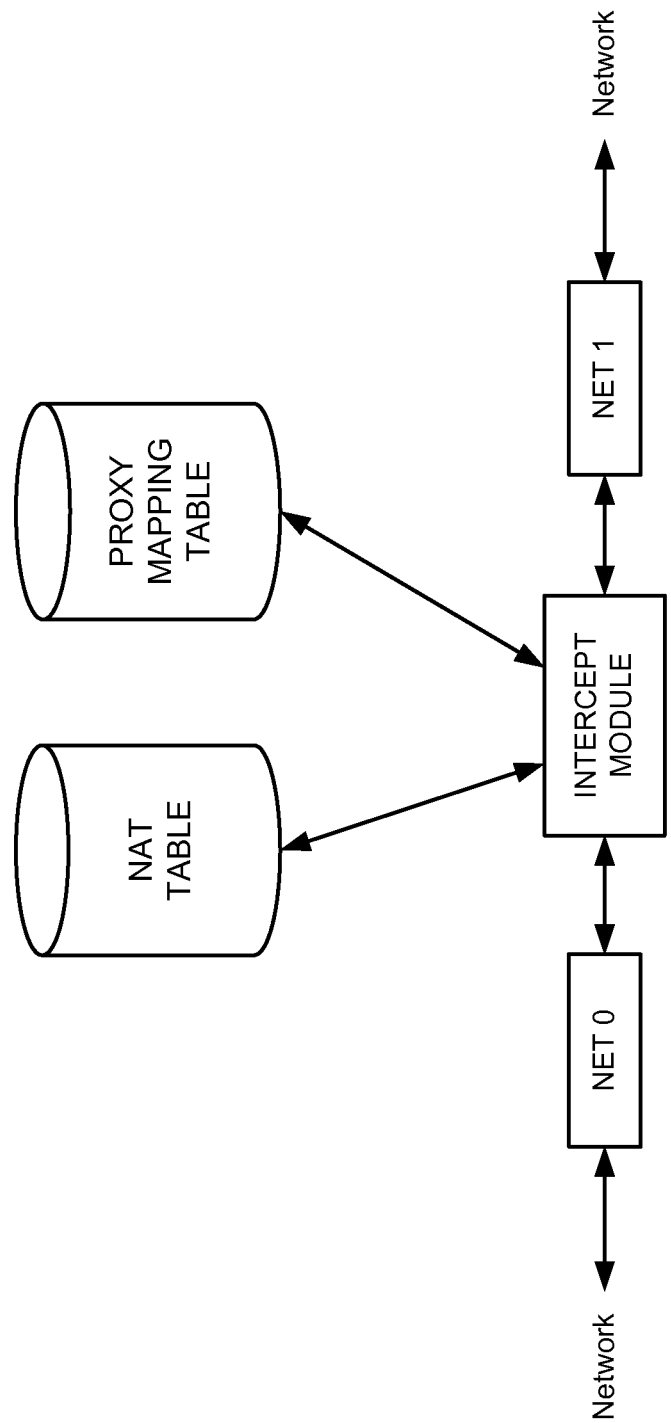
FIG. 10 is a diagram illustrating a connection deflector housing intercept and NAT functions in a stand-alone network device.

In another embodiment of the present invention, the intercept module and NAT and PMT tables are embodied in a network device that is separate from the proxy. FIG. 10 illustrates this arrangement, where the intercept and NAT functions are housed in a stand-alone network device called a "connection deflector". A connection deflector, in this form, is by itself a new type of network device that provides server-side transparency to a proxy configuration without placing the proxy device in the path between the client and server. Instead, the connection deflector is placed in the path and that device NATs packets to one or more proxies that are not in the path.

Figure 11:
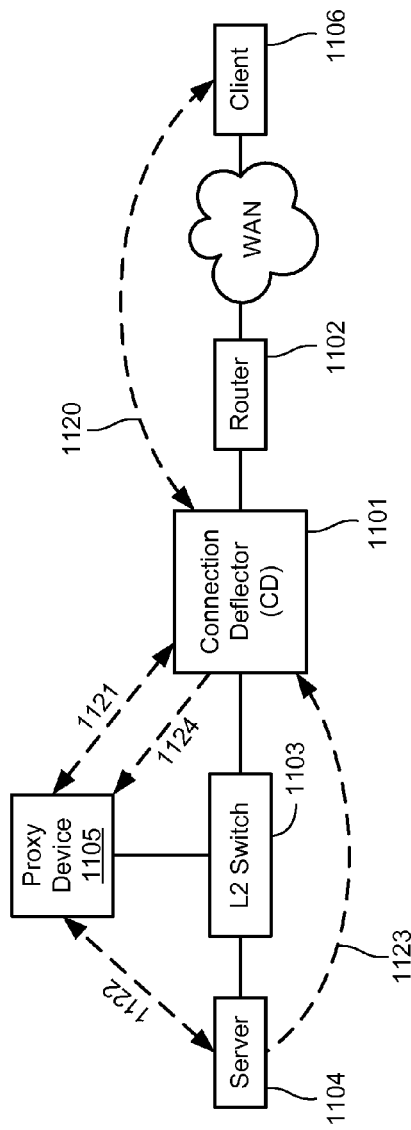
FIG. 11 is a diagram illustrating a connection deflector (CD) deployed to implement proxy interception in a manner that is fully transparent to a server.

A connection deflector may optionally include the logic described earlier for automatically populating entries in the PMT to perform proxy pair auto-discovery, but the device is also useful without this. In this simpler case, the PMT is populated with static entries, e.g., entered via user configuration. FIG. 11 illustrates how a single connection deflector (CD) 1101 is deployed to implement proxy interception in a manner that is fully transparent to the server. To do so, CD 1101 is situated in the path between a router 1102 and a layer-2 switch 1103. Attached to the switch are a proxy 1105 and a server 1104. The intercept module within CD 1101 forwards all packets between the switch and the router. When CD 1101 encounters a connection setup packet (e.g., a TCP SYN packet) from a client 1106 addressed to server 1104, it creates two NAT rules and installs these rules in its NAT table: a first rule causes the client-server flow in question to be directed toward proxy 1105 instead of server 1104, and a second rule causes packets sent from server 1104 to client 1106 on the return port to also be directed to proxy 1105 instead of the client. The proxy address for the NAT rule is determined from the PMT.

Optionally, when CD 1101 forwards the connection setup packet to proxy 1105, CD 1101 appends a message option in the connection setup packet to signal the server address to the proxy, thereby allowing the proxy to know that the client had initiated the connection to go to that particular destination. In turn, proxy 1105 terminates the transport connection from client 1106 and initiates a new transport connection 1122 to server 1104, but NATs the connection so the packets server 1104 receives over connection 1122 appear with a source address that corresponds to client 1106. As a consequence, server 1104 generates return packets addressed to the client rather than proxy 1105 along path 1123. These packets are thus delivered toward the client, through switch 1101 and CD 1105. At this point, the second NAT rule in CD 1101 mentioned above matches the packets and causes them to be transformed by NAT and directed to proxy 1105 along path 1124. Finally, proxy 1105 receives the packets and associates them to connection 1122 and processes them as if they had originated from the server and had originally been addressed to the proxy. Thus, proxy 1105 has successfully intercepted transport connection 1120 from client 1106 to server 1104 in a way that is completely transparent to server 1104.

A connection deflector is not limited to interoperating with a single proxy, single server, and single client as depicted in FIG. 11, but rather generalizes to support an arbitrary number of proxies, servers, and clients. By configuring different NAT rules for different servers and proxy combinations, an arbitrary number of entities are supported. Moreover, the proxies need not attach directly to the layer-2 switch but can be anywhere in the routed network. The only requirement is that the connection deflector be situated in both the forward and backward paths between the client and server so the traffic can be properly NAT'd in both directions.

Figure 12:
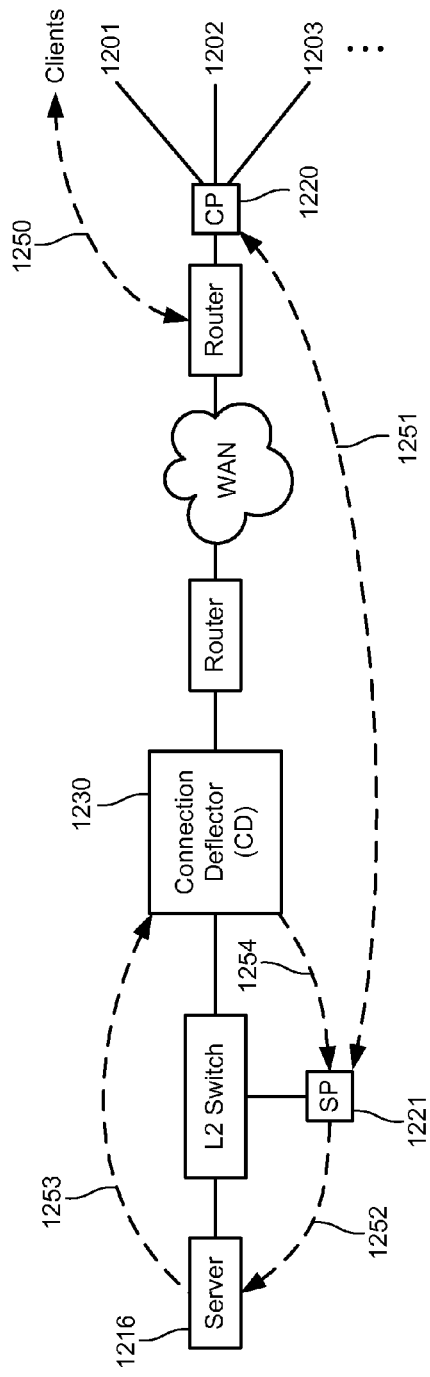
FIG. 12 is a diagram illustrating a client-side proxy (CP) and a server-side proxy (SP) situated with respect to a connection deflector.

In another embodiment, the connection deflector includes probing capabilities in the intercept module to perform proxy pair auto-discovery as described earlier. FIG. 12 shows how the client-side proxy (CP) and server-side proxy (SP) are situated with respect to the connection deflector. Here, CD 1230 is situated in the network data path but SP 1221 is situated out of path attached to a layer-2 switch. This separation is amenable to high performance implementation as it allows simple network functions like packet forwarding, NAT, probe generation and interpretation, and so forth to be implemented in a dedicated network device while higher-level proxy functions can be implemented in a general purpose computing device that is not in the critical path of the network.

In this configuration, the exchange of messages that perform proxy auto-discovery is modified because the CP and SP communicate with a non-transparent connection that does not need to be NAT'd. In fact, only one NAT rule per client-server session need be installed in the CD to handle the return path from the server to the client, as the forward path is transparently intercepted at the CP. Also, the CD and CP perform auto-discovery while the SP does not.

FIG. 12 shows one way to deploy a connection deflector to perform proxy pair auto-discovery. When client 1201 initiates a connection to server 1210, CP 1220 intercepts the connection request packet and appends a probe request option as described earlier. The connection request packet is intercepted by CD 1230, which in turn, responds to the probe providing the address of SP 1221 as the contact point. At the same time, CD 1230 installs a NAT rule that causes traffic sent from server 1210 to client 1201 on the return port of the connection in question to be diverted via NAT to SP 1221. CP 1220 then terminates the client connection 1250, initiates a new connection (or virtual connection) 1251 to SP 1221. Next, SP 1221 initiates a connection 1252 to server 1216 on behalf of client 1220 and NATs the source address so that server 1216 believes the incoming connection is arriving from client 1220 even though the connection originates from SP 1221. Thus, the return packets from server 1210 corresponding to connection 1252 follow path 1253 toward client 1201. When the packets reach CD 1230, the newly installed NAT rule matches the packets and causes them to be NAT'd and diverted back to SP 1221. Thus, the CP, SP, and CD successfully discovered the presence of one another and intercepted the client/server connection, without having the SP in the network path and while maintaining strict transparency for the server.

Clustering and Load Balancing

The configuration of FIG. 12 can be generalized with multiple SPs at the server site to support clustering and load balancing. Suppose there are N SPs instead of just one. Then, CD 1230 could select one of the N and return the address of the selected SP to the CP in a probe response packet. The selection could be based on availability, load, and so forth. Or, preferably, CD 1230 could return a list of available SPs to CP 1220 in the probe response packet. This would allow CP 1220 to store the list in its PMT and select an SP using its own discretion. For example, it might favor one primary device over other secondary devices and only use secondary devices when the primary device is unavailable or near capacity. Depending on the particular functions the proxy performs, such a policy could enhance the performance of proxy pairs since the same pairs will tend to be used consistently over time. Another approach is to have the CP employ a consistent hash (e.g., as a function of the server and client addresses) so that the same client-server sessions are consistently mapped onto the same SP, again enhancing the performance of the proxy end points.

Variations

Figure 13:
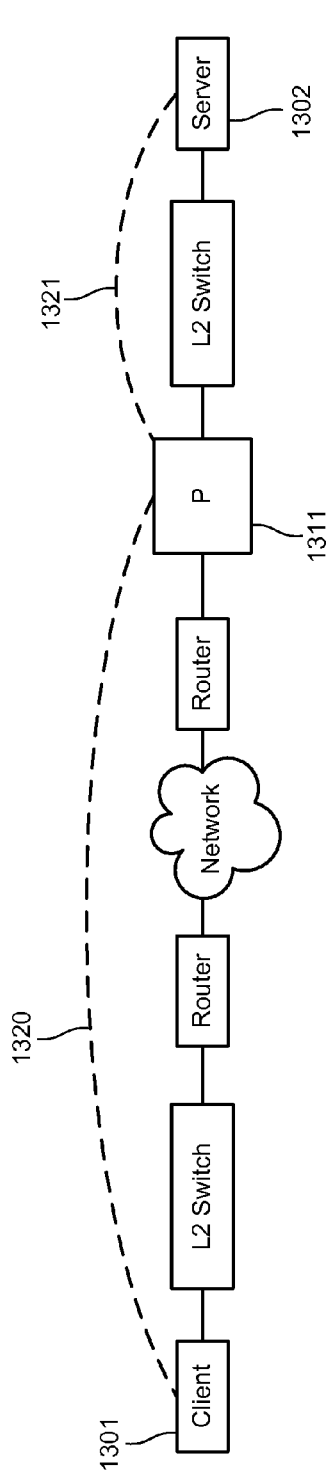
FIG. 13 illustrates a variation of a proxy device, where a single proxy intercepts client connections and server connections, but interacts with each using the other's address.

FIG. 13 illustrates a variation that is useful beyond auto-discovery of proxy pairs and can be used with an unpaired proxy. In this variation, a single proxy 1311 is situated in a path between the client 1301 and the server 1302 such that all traffic along the forward path from client 1301 to server 1302 flows through proxy 1311 and all traffic along the reverse path from server 1302 to client 1301 flows through proxy 1311.

When client 1301 initiates a connection 1320 to server 1302, proxy 1311 intercepts the client packets and terminates the connection within that device even though the packets comprising the connection are addressed to server 1302. In addition, all packets that originate from proxy 1311 as part of connection 1320 are assigned a source address that corresponds to the address of server 1302. Thus, client 1301 appears to itself to be communicating directly with server 1302 even though connection 1320 is terminated at proxy 1311. When proxy 1311 successfully establishes connection 1320, it establishes another connection 1321 with server 1302, whereby it assigns a source address to all packets it originates on connection 1321 with the address of client 1301. Thus, server 1302 appears to itself to be communicating directly with client 1301 even though connection 1321 is terminated at proxy 1311.

Once the connections have been established, messages can be transmitted between the client and server in either direction through the proxy intermediary, which can perform the arbitrary transformations on the connection data as described herein and elsewhere.

Figure 14:
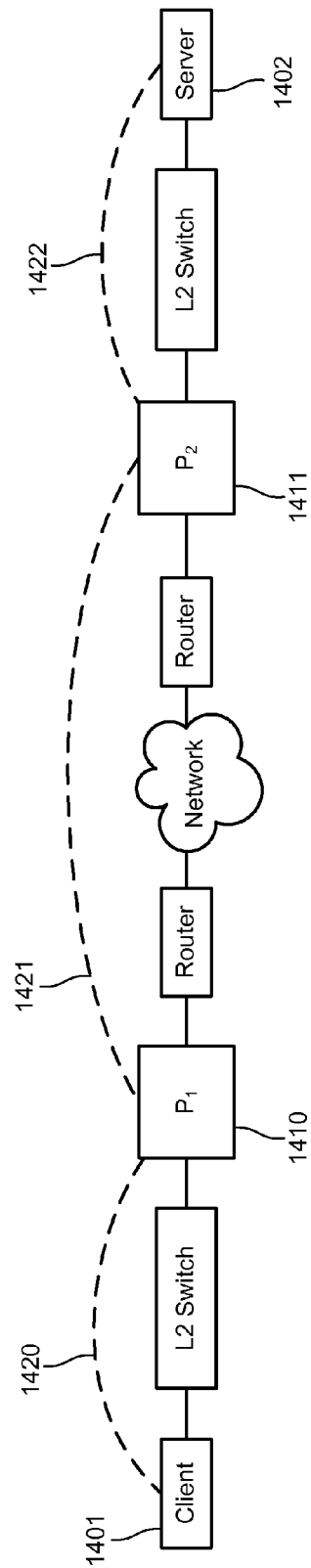
FIG. 14 illustrates another variation, wherein a pair of proxy devices are used as shown in FIG. 13.

FIG. 14 illustrates the variation of FIG. 13 with a pair of proxies instead of a single proxy. In the example shown there, a proxy 1411 and another proxy 1410 are situated in path between the client 1401 and the server 1402 such that all traffic along the forward path from client 1401 to server 1402 flows through proxy 1410 and all traffic along the reverse path from server 1402 toward client 1401 flows through proxy 1411. When client 1401 initiates a connection 1420 to server 1402, proxy 1410 intercepts the client packets and terminates the connection within that device even though the packets comprising said connection are addressed to server 1402. In addition, all packets that originate from proxy 1410 as part of connection 1420 are assigned a source address that corresponds to the address of server 1402. Thus, client 1401 appears to be communicating directly with server 1402 even though connection 1420 is terminated at proxy 1410. Proxy 1410 then opens another connection 1421 to proxy 1411. Alternatively, proxy 1410 could re-use an existing connection between proxy 1410 and proxy 1411 and implement connection multiplexing as described earlier. When proxy 1410 and proxy 1411 successfully establishes connection 1421, proxy 1411 establishes another connection 1422 with server 1402, whereby it assigns a source address to all packets it originates on connection 1422 with the address of client 1401. Thus, server 1402 appears to be communicating directly with client 1401 even though connection 1422 is terminated at proxy 1411.

Figure 15A:
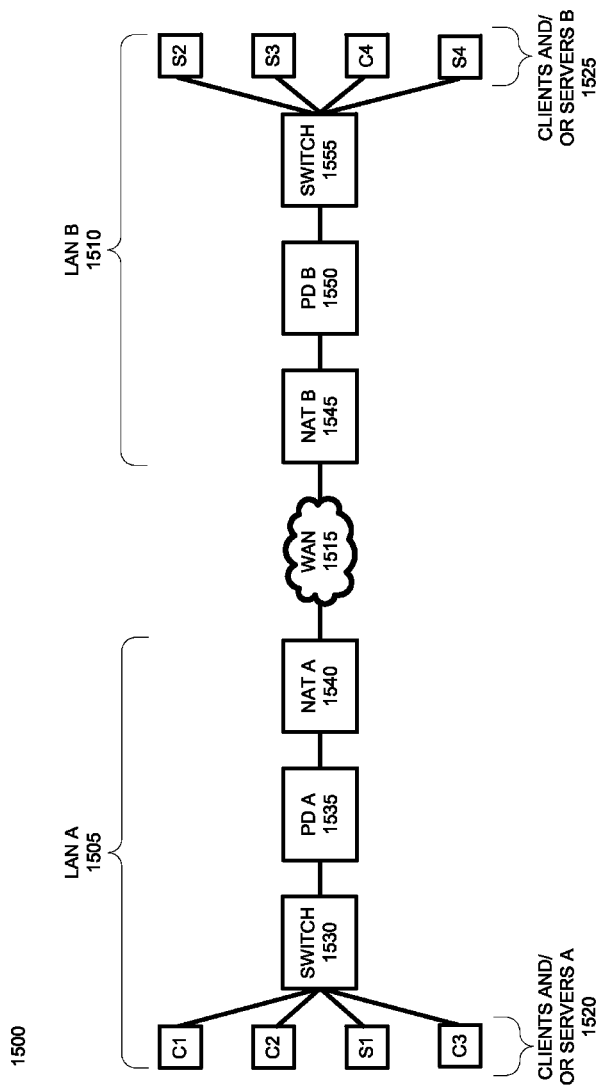
FIGS. 15A-15B illustrate example networked systems including proxy devices and network address translation (NAT) devices interposed in a network path between a client and a server.
Figure 15B:
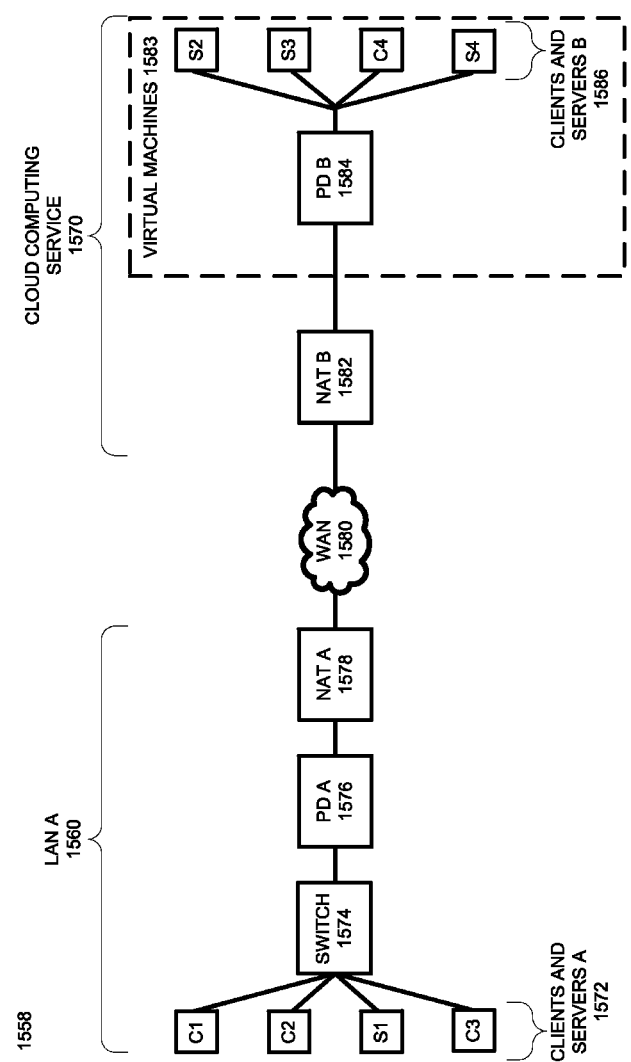

Auto-Discovery and Connection Interception through Network Address Translation FIGS. 15A-15B illustrate example networked systems including proxy devices and network address translation (NAT) devices interposed in a network path between a client and a server.

FIG. 15A illustrates a networked system 1500 including a first local-area network (LAN) A 1505 and a second LAN 1510 connected via one or more wide-area networks (WAN) 1515. LANs A 1505 and B 1510 each include one or more clients and/or servers 1520 and 1525, respectively. Each of the sets of clients and/or servers 1520 and 1525 are connected through one or more switches or other network devices 1530 and 1555 to a proxy device. For example, LAN A 1505 includes proxy device A 1535 and LAN B 1510 includes proxy device B 1550.

LANs A 1505 and B 1510 are connected with WAN 1515 through two or more network address translation (NAT) devices 1540 and 1545. NAT devices may include routers, firewalls, and layer 4 switch devices. NAT devices receive network packets and modify their source and/or destination addresses before forwarding them towards their destination. NAT devices are commonly used at the border between one network of hosts and another network, such as the border between LANs A 1505 and B 1510 with WAN 1515. Example networked system 1500 illustrates a typical usage of NAT devices that enables devices within each of the LANs to have private network addresses that are not visible to devices outside of the LAN A 1505. For example, NAT A 1540 modifies packets from clients and servers A 1520 leaving LAN A 1505 so that they appear to originate from one or more public network addresses and/or network port numbers. NAT devices such as NAT A 1540 maintain connection state information so that inbound network packets addressed to public network addresses are matched with their corresponding private network addresses within the LAN and redirected to the correct client or server. Because of the usage of NAT devices 1540 and 1545, the private network addresses of clients and servers 1520 and 1525 are not visible to network devices outside of their respective LANs 1505 and 1510.

FIG. 15B illustrates another networked system 1558. Networked system 1558 includes a first local-area network (LAN) A 1560 connected via one or more wide-area networks (WAN) 1580. LAN A 1560 includes one or more clients and/or servers 1572 connected through one or more switches or other network devices 1574 to proxy device A 1576. Proxy device A 1576 is further connected through at least NAT device A 1578 with WAN 1580. NAT device A 1578 associates the private network addresses of clients and servers 1572 to one or more public network addresses and/or network ports. Because of NAT device A 1578, the private network addresses of clients and servers A 1572 are not visible to network devices outside of LAN A 1560.

A cloud computing service 1570 is also connected with WAN 1580 through at least NAT device B 1582. Cloud computing service 1570 provides on-demand provisioning of computing resources, such as processing resources, storage resources, content hosting; and/or application software. Cloud computing service 1570 typically provides computing resources to users through internet protocols and standards, such as TCP/IP, HTTP, and XML. Users typically do not need to know the location, configuration, or other details of the internal infrastructure of cloud computing service 1570. Additionally, cloud computing service 1570 typically provides access to computing resources through abstract interfaces that enable computing resources to be dynamically provisioned and/or virtualized.

In example networked system 1558, network devices in cloud computing service 1570 is connected with WAN 1580 through at least NAT device B 1582. Cloud computing service 1570 includes a proxy device B 1584 and one or more clients and servers 1586. Optionally, the proxy device B 1584 and/or some or all of the clients and servers 1586 may be implemented as virtualized devices executing within virtualization applications.

FIG. 16 illustrates an example problem 1600 encountered during auto-discovery and connection establishment between two proxy devices separated by one or more NAT devices.

Example 1600 is based on a networked system similar to networked system 1500 shown in FIG. 15A. Example 1600 begins with an auto-discovery phase. For clarity, some messages associated with auto-discovery have been omitted from example 1600, such as the messages and indicators used to determine if a proxy device is closest to a destination device, as described above.

In example 1600, a client device 1605 within a first LAN A sends a connection initiation message, such as a TCP/IP SYN message 1632 to a server 1630. SYN message 1632 includes the private network address of client 1605 (CL.PRIV) and the public network address of server 1630 (S.PUB), because these are the only network addresses for these devices known to client 1605.

SYN message 1632 is intercepted or redirected to proxy device A 1610 associated with the first LAN A. Proxy device A 1610 creates a probe indicator adapted to indicate the presence of the proxy device A 1610 to any downstream proxy devices and forwards a modified SYN message 1634 including the probe indicator towards its destination network address.

Modified SYN message 1634 is intercepted or redirected to NAT device A 1615. NAT device A 1615 modifies the source address of this message to a public network address and/or network port (CL.PUB) assigned to the client 1605 by the NAT device A 1615. A second modified SYN message 1636 including the probe indicator and the client's public network address is forwarded, over LANs and/or WANs, towards its destination network address, which in this example is still the server public network address (S.PUB).

Second modified SYN message 1636 is intercepted or redirected to NAT device B 1620 at the boundary of a second LAN B. NAT device B 1620 modifies the destination address of this message to a private network address and/or network port of the server 1630 (S.PRIV). A third modified SYN message 1638 including the probe indicator, the client's public network address, and the server's private network address is forwarded over LAN B towards its destination, the server private network address (S.PRIV).

Third modified SYN message 1638 is intercepted or redirected to proxy device B 1625 associated with the second LAN B. Proxy device B 1625 detects the presence of probe indicator in SYN message 1638 and infers the existence of proxy device A 1610. In response, proxy device B 1625 generates a probe response indicator (PR) including information to be used by proxy device A 1610 to establish a direct connection with proxy device B 1625. For example, the probe response indicator may include a network address assigned to proxy device B 1625. This direct connection, referred to as an inner connection, may be used to optimize network traffic between the client 1605 and server 1630, for example using the above-described connection multiplexing techniques or any other WAN optimization techniques known in the art. Proxy device B 1625 returns a connection acknowledgement message, such as a TCP/IP SYN/ACK message 1640, to the client 1605 that includes this probe response indicator as well as the client's public network address and the server's private network address, which are the only network addresses for these devices known to the proxy B 1625.

SYN/ACK message 1640 is intercepted or redirected to NAT device B 1620 at the boundary of the second LAN B. NAT device B 1620 modifies the source address of this message to the public network address and/or network port of the server 1630 (S.PRIV). A first modified SYN/ACK message 1642 including the probe response indicator, the client's public network address, and the server's public network address is forwarded from LAN B over other LANs and/or WANs towards its destination, the public network address of the client 1605 (CL.PUB).

First modified SYN/ACK message 1642 is intercepted or redirected to NAT device A 1615 at the boundary of the first LAN A. NAT device A 1615 modifies the destination address of this message to the private network address and/or network port of the client 1605 (CL.PRIV). A second modified SYN/ACK message 1644 including the probe response indicator, the client's private network address, and the server's public network address is forwarded from NAT device A 1615 over other LAN A towards its destination, the private network address of the client 1605 (CL.PRIV).

Second modified SYN/ACK message 1644 is intercepted or redirected to proxy device A 1610 associated with the first LAN A. Proxy device A 1610 detects the presence of probe response indicator in SYN/ACK message 1644 and infers the existence of proxy device B 1625.

In response to SYN/ACK message 1644, proxy device A 1610 will send one or more inner connection setup messages 1646 directly to proxy device B 1625 to establish an inner connection for optimizing the communications between client 1605 and server 1630. For example, network traffic from client 1610 may be intercepted or redirected to proxy device A 1610. Proxy device A 1610 may compress or otherwise optimize this network traffic and forward it via the inner connection directly to proxy device B 1625. Proxy device B 1625 will decompress or otherwise process this optimized network traffic to convert it back to its original form and then forward this reconstructed network traffic over LAN B to server 1630. A similar process is performed on network traffic from server 1630 to client 1610.

To perform these optimizations, proxy device B 1625 needs to be able to direct network traffic received through the inner connection to its intended destination. Client 1605 and proxy device A 1610 direct network traffic to the server 1630 via its public network address, which is the only network address for the server 1630 visible behind NAT device A 1615. So, when network traffic arrives via the inner connection at proxy device B 1625, proxy device B 1625 is only told by proxy device A 1610 about the public server address and the client private address. Therefore, proxy device B 1625 is unable to direct network traffic received via the inner connection to the intended destination. This is the reason that proxy device B 1625 sometimes cannot connect to server 1630, because proxy device B 1625 only knows the client public network address and the server private network address of these devices. Proxy device B 1620 has no way to match the server public network address with its private network address and/or the client public network address with its private network address, and thus cannot match the network addresses provided by proxy device A 1610 to any network addresses that it sees from behind NAT device B 1620.

One prior approach to solving this problem is to operate the proxy devices in a full transparency mode. In this mode, the inner channel used to communicate optimized network traffic between proxy devices uses the client and server network addresses, rather than separate proxy device network addresses. Full transparency mode relies on the NAT devices to correctly match private and public network addresses. However, full transparency mode requires that the proxy devices intercept all network traffic addressed to the client and server network addresses. If optimized network traffic bypasses a proxy device and reaches the client or server first, application errors and data corruption may occur. Moreover, configuring the proxy devices to intercept all network traffic between client and server devices can cause routing loops and other network routing problems.

Because of these problems with full transparency, it is desirable to configure proxy devices to communicate optimized network traffic via their own separate network addresses and optionally separate network ports, even in the presence of one or more NAT devices. FIG. 17 illustrates a method 1700 of automatically discovering and establishing connections between proxy devices separated by one or more NAT devices according to an embodiment of the invention. Embodiments of method 1700 may be utilized with proxy devices configured to communicate optimized network traffic via their network addresses and optionally network ports that are different than the network addresses of clients and servers, even if the proxy devices are separated via one or more NAT devices.

In step 1705, a first proxy device receives a network connection request that includes an auto-discovery probe indicator. The connection request may be intercepted or redirected to the first proxy device on its way to a public or private network address associated with a server.

Step 1710 generates an connection identifier and stores the connection identifier in association with the source and/or destination network addresses and optionally other connection information included in the network connection request. Step 1710 stores the source and/or destination addresses included in the connection request at the time it is received by the first proxy device. For example, a client device may send a connection request including the client's private network address and a server's public network address, as shown in example 1600. However, after passing through two or more NAT devices, this connection request will have been modified to include the client's public network address and the server's private network address. In this example, step 1710 stores the client's public network address and the server's private network address in association with the connection identifier.

In an embodiment, each connection request received by the first proxy device is assigned a different connection identifier, such at that no two active connections will have the same connection identifier in the first proxy device. Embodiments of the invention may generate and assign connection identifiers in numerous ways, such as sequentially, randomly, or using hashes or other data fingerprinting of connection request attributes. In still further embodiments, connection identifiers can include other information, such as virtual LAN identifiers or DSCP data for packet classification and quality-of-service (QoS).

In an alternate embodiment, the connection identifier is generated by a client-side proxy device and included in the connection request message. In this embodiment, the first proxy device still stores the connection identifier in association with the source and/or destination network addresses and optionally other connection information included in the network connection request.

Step 1715 returns an auto-discovery response message including the connection identifier. In an embodiment, the connection identifier may be included as all or a portion of an additional attribute field in the auto-discovery response message. For example, the connection identifier may be included in a TCP options attribute field along with a probe response connection identifier and the network address of the first proxy device.

In an embodiment, auto-discovery response message is directed back to the client initiating the connection request. As described above, the auto-discovery response message is intercepted or redirected back to a client-side proxy device. The client-side proxy device uses the auto-discovery response message and the probe response connection identifier to initiate a separate inner connection with the first proxy device. As part of this, the client-side proxy device sends at least one inner connection setup message to the first proxy device. The client-side proxy device includes the connection identifier previously generated in step 1710 with the inner connection setup message.

At step 1720, the first proxy device receives the inner connection setup message including the connection identifier from the client side proxy device. In step 1725, the first proxy device retrieves the previously-stored source and/or destination network addresses and optionally other connection information using the connection identifier included in the inner connection setup message. This allows the first proxy device to identify the source and destination addresses to be associated with optimized network traffic carried by the inner network connection.

For example, if the first proxy device and the client-side proxy device are separated by two NAT devices, as shown in example 1600, the first proxy device stores the client's public network address and the server's private network address in association with the connection identifier upon receiving the connection request with the auto-discovery probe. Later, when the inner connection setup message with this connection identifier is received, the first proxy device associates this inner connection with the previously stored client public network address and the server private network address. Thus, the first proxy device knows that any network traffic from the server and directed to the client's public network address should be intercepted, optimized, and sent to the client-side proxy device via this inner connection. Similarly, any optimized network traffic received by the first proxy device via this inner connection should be reconstructed or otherwise processed and then forwarded to the server's private network address.

Even though network traffic between a client and server is carried via the inner connection, in a further embodiment, the first proxy device and/or the client-side proxy device frequently send messages using the same connection used for auto-discovery, such as every 20 seconds. This prevents this connection from being closed and used by other devices, preventing an connection identifier being used for more than one connection by the first proxy device, which could result in network traffic being misdirected.

FIG. 18 illustrates an example implementation 1800 of auto-discovery and connection establishment between two proxy devices separated by one or more NAT devices according to an embodiment of the invention. Example 1800 begins with an auto-discovery phase in which a client device 1805 within a first LAN A sends a connection initiation message, such as a TCP/IP SYN message 1832 to a server 1830. SYN message 1832 includes the private network address of client 1805 (CL. PRIV) and the public network address of server 1830 (S.PUB), because these are the only network addresses for these devices known to client 1805.

SYN message 1832 is intercepted or redirected to proxy device A 1810 associated with the first LAN A, which creates a probe indicator adapted to indicate the presence of the proxy device A 1810 to any downstream proxy devices and forwards a modified SYN message 1834 including the probe indicator towards its destination network address.

Modified SYN message 1834 is intercepted or redirected to NAT device A 1815, which modifies the source address of this message to a public network address and/or network port (CL.PUB) assigned to the client 1805 by the NAT device A 1815. A second modified SYN message 1836 including the probe indicator and the client's public network address is forwarded, over LANs and/or WANs, towards its destination, the server public network address (S.PUB).

Second modified SYN message 1836 is intercepted or redirected to NAT device B 1820 at the boundary of a second LAN B. NAT device B 1620 modifies the destination address of this message to a private network address and/or network port of the server 1830 (S.PRIV) and sends a third modified SYN message 1838 including the probe indicator, the client's public network address, and the server's private network address is forwarded over LAN B towards its destination, the server private network address (S.PRIV).

Third modified SYN message 1838 is intercepted or redirected to proxy device B 1825 associated with the second LAN B. Proxy device B 1825 detects the presence of probe indicator in SYN message 1838 and infers the existence of proxy device A 1810. In response, proxy device B 1825 generates an connection identifier (ID) and stores this connection identifier in association with the connection information, such as the source and destination addresses of the third modified SYN message 1838. In this example, proxy device B 1825 stores the connection identifier and the client public and server private network addresses 1860.

Probe device B then generates a probe response indicator (PR) including information to be used by proxy device A 1810 to establish a direct connection with proxy device B 1825 and returns a connection acknowledgement message, such as a TCP/IP SYN/ACK message 1840, to the client 1805 that includes this probe response indicator and connection identifier, as well as the client's public network address and the server's private network address, which are the only network addresses for these devices known to the proxy device B 1825.

SYN/ACK message 1840 is intercepted or redirected to NAT device B 1820, which creates first modified SYN/ACK message 1842 including the probe response indicator and the connection identifier, the client's public network address, and the server's public network address. First modified SYN/ACK message 1842 is similarly intercepted or redirected to NAT device A 1815 which modifies the destination address of this message to the private network address and/or network port of the client 1805 (CL.PRIV) and forwards modified SYN/ACK message 1844 including the probe response indicator and the connection identifier, the client's private network address, and the server's public network address towards its destination, client 1805.

Second modified SYN/ACK message 1844 is intercepted or redirected to proxy device A 1810 associated with the first LAN A. Proxy device A 1810 detects the presence of probe response indicator in SYN/ACK message 1844 and infers the existence of proxy device B 1825. Additionally, proxy device detects the presence of the connection identifier.

In response to SYN/ACK message 1844, proxy device A 1810 will send one or more inner connection setup messages 1846 directly to proxy device B 1825 to establish an inner connection for optimizing the communications between client 1805 and server 1830. Inner connection setup message 1846 includes the connection identifier. Proxy device B 1825 uses the connection identifier to retrieve the previously-stored source and/or destination network addresses and optionally other connection information 1860. By matching the inner connection with the previously stored server private network address (S.PRIV) and the client public network address (CL.PUB), proxy device B can optimize network traffic 1850 between the server 1830 and client 1805. For example, proxy device B can intercept and optimize network traffic from the server's private network address S.PRIV and directed to the client's public network address CL.PUB and send this optimized network traffic to proxy device A 1810 via this inner connection. Similarly, any optimized network traffic received by proxy device B 1830 via this inner connection can be reconstructed or otherwise processed and then forwarded to the server's private network address S.PRIV with a source network address of the client's public network address CL.PUB.

Once the connections have been established, messages can be transmitted between the client and server in either direction through the proxy intermediaries, which can perform the arbitrary transformations on the connection data as described herein and elsewhere.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of establishing a network connection between proxy devices, the method comprising:
    receiving, at a first proxy device, a connection request message from a first network device to a second network device, wherein the connection request message includes an auto-discovery indicator adapted to indicate that an existence of a second proxy device and connection information associated with the first and second network devices, wherein the first proxy device receives the connection request message directed from a public network address of the first network device to a private address of the second network device, and wherein the second proxy device receives the connection request message directed from a private network address of the first network device to a public address of the second network device;
    storing the connection information in association with a connection identifier at the first proxy device;
    sending a connection response message including the connection identifier to the first network device, wherein the connection response message is adapted to indicate the existence of the first proxy device to the second proxy device;
    receiving an inner network connection setup message at the first proxy device from the second proxy device, wherein the inner network connection setup message is adapted to establish an inner network connection between the first and second proxy devices and includes the connection identifier;
    retrieving the connection information using the connection identifier; and
    using the connection information, directing network traffic associated with the inner network connection to the second network device.

2. The method of claim 1, wherein the connection request message is associated with first network addresses of the first and second network devices that are different from second network addresses of the first and second proxy devices used for the inner connection setup message.

3. The method of claim 1, wherein storing the connection information in association with the connection identifier at the first proxy device comprises:
    generating, at the first proxy device, the connection identifier.

4. The method of claim 1, wherein storing the connection information in association with the connection identifier at the first proxy device comprises:

retrieving, at the first proxy device, the connection identifier from the connection request message, wherein the connection identifier was previously generated by the second proxy device.

5. The method of claim 1, wherein the connection information includes at least one network address of the first and/or second network devices.

6. The method of claim 5, wherein the network address includes a public network address associated with the first network device as detected by the first proxy device.

7. The method of claim 5, wherein the network address includes a private network address associated with the second network device as detected by the first network proxy.

8. The method of claim 1, comprising:
using the connection information, intercepting second network traffic from the second network device directed to the first network device.

9. The method of claim 1, wherein the network traffic associated with the inner network connection is generated at the first proxy device based on optimized network traffic received at the first proxy device via the inner connection.

10. A method of establishing a network connection between proxy devices, the method comprising:
receiving, at a first proxy device, a connection request message from a first network device to a second network device, wherein the first proxy device receives the connection request message directed from a private network address of the first network device to a public address of the second network device;
forwarding a modified connection request message based on the connection request message and including an auto-discovery indicator adapted to indicate the existence of the first proxy device;
receiving a connection response message including an auto-discovery response indicator adapted to indicate the presence of a second proxy device between the first proxy device and the second network device, wherein the connection response message includes a connection identifier, and wherein the second proxy device receives the connection request message directed from a public network address of the first network device to a private address of the second network device; and
sending an inner connection setup message to the second proxy device, wherein the inner connection setup message includes the connection identifier.

11. The method of claim 10, wherein the connection request message is associated with first network addresses of the first and second network devices that are different from second network addresses of the first and second proxy devices used for the inner connection setup message.

12. The method of claim 10, wherein the connection request message is associated by the first proxy device with first network addresses of the first and second network devices and the connection response message is associated by the second proxy device with second network addresses of the first and second network device.

13. The method of claim 12, wherein the connection identifier is adapted to indicate to the second proxy device an association between the second network addresses and the inner connection setup message.

14. The method of claim 13, wherein the connection identifier is adapted to enable the second proxy device to retrieve stored connection information including at least a portion of the second network addresses.

15. The method of claim 12, wherein the first network addresses include a private network address of the first network device and a public network address of the second network device.

16. The method of claim 12, wherein the second network addresses include a public network address of the first network device and a private network address of the second network device.

17. The method of claim 10, wherein forwarding the modified connection request message comprises:
generating the connection identifier at the first proxy device; and
including the connection identifier in the modified connection request message.

18. The method of claim 10, wherein receiving the connection response message includes receiving the connection identifier generated at the second proxy device.

* * * * *